(12) United States Patent
Liu et al.

(10) Patent No.: US 7,887,954 B2
(45) Date of Patent: Feb. 15, 2011

(54) ELECTROCHEMICAL COMPOSITION AND ASSOCIATED TECHNOLOGY

(75) Inventors: Wen-Ren Liu, Bade (TW); Chih-Wei Yang, Taoyuan (TW); Ben-Jie Liaw, Taoyuan (TW)

(73) Assignee: Advanced Lithium Electrochemistry Co., Ltd., Taoyuan (TW)

( * ) Notice: Subject to any disclaimer, the term of this patent is extended or adjusted under 35 U.S.C. 154(b) by 549 days.

(21) Appl. No.: 11/940,283

(22) Filed: Nov. 14, 2007

(65) Prior Publication Data
US 2008/0107967 A1  May 8, 2008

Related U.S. Application Data

(63) Continuation-in-part of application No. 11/747,746, filed on May 11, 2007, now Pat. No. 7,781,100, which is a continuation-in-part of application No. 11/510,096, filed on Aug. 25, 2006, now Pat. No. 7,700,236, which is a continuation-in-part of application No. 11/222,569, filed on Sep. 9, 2005, now abandoned, application No. 11/940,283, which is a continuation-in-part of application No. 11/518,805, filed on Sep. 11, 2006.

(30) Foreign Application Priority Data
May 10, 2005  (TW) ............................ 94115023 A
May 11, 2006  (CN) ........................ 2006 1 0080365

(51) Int. Cl.
*H01M 4/58* (2010.01)
*H01M 4/36* (2010.01)
*C01B 25/45* (2006.01)

(52) U.S. Cl. ................. 429/218.1; 252/182.1; 423/306; 429/220; 429/221; 429/223; 429/224; 429/229; 429/231.5; 429/231.6; 429/231.9; 429/231.95

(58) Field of Classification Search .............. 429/218.1, 429/220, 221, 223, 224, 229, 231.5, 231.6, 429/231.9, 231.95; 252/182.1; 423/306
See application file for complete search history.

(56) References Cited

U.S. PATENT DOCUMENTS 5,871,866 A    2/1999  Barker et al.

(Continued)

FOREIGN PATENT DOCUMENTS

JP  2003-323892  11/2003

OTHER PUBLICATIONS

Brochure, Advanced Lithium Electrochemistry Co., Ltd., Sep. 2007, 4 pages.

(Continued)

*Primary Examiner*—Wayne Langel
(74) *Attorney, Agent, or Firm*—Kirton & McConkie; Evan R. Witt

(57) ABSTRACT

A composition for use in an electrochemical redox reaction may comprise a first material represented by $M_yXO_4$ or $A_xM_yXO_4$, where each of A, M, and X independently represents at least one element, O represents oxygen, and each of x and y represent a number, and second material selected from SiC, BN, carbon tube material, carbon fiber material, and an oxide of at least one element. When the first material is represented by $M_yXO_4$, it may be capable of being intercalated with ionic A to form $A_xM_yXO_4$. At least a portion of the second material may be at least partially distributed within the first material and/or may at least partially coat the first material. An electrode comprising such a composition is also described, as is an electrochemical cell comprising such an electrode. A process of preparing a composition for use in an electrochemical redox reaction is also described.

25 Claims, 10 Drawing Sheets

U.S. PATENT DOCUMENTS

| | | | |
|---|---|---|---|
| 5,910,382 | A | 6/1999 | Goodenough et al. |
| 6,085,015 | A | 7/2000 | Armand et al. |
| 6,203,946 | B1 | 3/2001 | Barker et al. |
| 6,514,640 | B1 | 2/2003 | Armand et al. |
| 6,632,566 | B1 | 10/2003 | Yamada et al. |
| 6,716,372 | B2 | 4/2004 | Barker et al. |
| 6,815,122 | B2 | 11/2004 | Barker et al. |
| 6,884,544 | B2 | 4/2005 | Barker et al. |
| 7,001,690 | B2 | 2/2006 | Barker et al. |
| 7,026,072 | B2 | 4/2006 | Barker et al. |
| 7,087,346 | B2 | 8/2006 | Barker et al. |
| 7,326,494 | B2 | 2/2008 | Wang et al. |
| 2003/0215715 | A1 | 11/2003 | Barker et al. |
| 2004/0005265 | A1 | 1/2004 | Chiang et al. |
| 2006/0147809 | A1* | 7/2006 | Amine et al. ............... 429/326 |
| 2006/0246351 | A1 | 11/2006 | Barker et al. |
| 2006/0257307 | A1 | 11/2006 | Yang |
| 2007/0031732 | A1 | 2/2007 | Chiang et al. |
| 2007/0059598 | A1 | 3/2007 | Yang |
| 2007/0082267 | A1 | 4/2007 | Goodenough et al. |
| 2007/0141468 | A1 | 6/2007 | Barker |
| 2007/0207080 | A1 | 9/2007 | Yang |
| 2007/0207385 | A1 | 9/2007 | Liu |
| 2007/0238021 | A1 | 10/2007 | Liu |
| 2007/0264567 | A1 | 11/2007 | Yang |
| 2008/0138710 | A1 | 6/2008 | Liaw et al. |

PUBLICATIONS

Catti et al., "Extensive Lithium Disorder in $Li_{1.5}Fe_{0.5}Ti_{1.5}(PO_4)$ Nasicon by Neutron Diffraction, and the $Li_{1+x}Fe_xTi_{2-x}(PO_4)3$ Phase Diagram," *Journal of Materials Chemistry*, 14, 2004, pp. 835-839.

Chen et al., "Studies of $LiCoO_2$ Coated with Metal Oxides," *Electrochemical and Solid-State Letters*, 6, (11), 2003, pp. A221-A224.

Chinese Patent Application No. 200610080365.5 filed on May 11, 2006, 20 pages.

Cho, "Zero-Strain Intercalation Cethod for Rechargeable Li-Ion Cell," *Angew.Chem. Int. Ed*., 2001, 40, No. 18, pp. 3367-3369.

Davis, et al., "Studies of Phase Relationships in Cocrystal Systems," *American Crystallographic Association*, 2004, 39, pp. 41-61.

Deb et al., "Structural Investigations of $LiFePO_4$ Electrodes and In Situ Studies by Fe X-Ray Absorption Spectroscopy," *Electrochimica Acta*, 50, 2005, pp. 5200-5207.

Eyob et al., "A Neutron Powder Diffraction Study of Electrochemically Lithiated $R-Li_{3+x}Fe_2(PO_4)_3$ for x=1.8," *Journal of Materials Chemistry*, 2002, 12, pp. 2343-2347.

Goldstone, et al., "Introduction to Atomic Emission Spectrometry," *ICP Optical Emission Spectroscopy*, Technical Note 12, pp. 1-6.

Hwang, et al., "$LiMn_2O_4$ Core Surrounded by $LiCo_xMn_{2-x}O_4$ Shell Material for Rechargeable Lithium Batteries," *Journal of Electrochemical Society*, 149, 6, 2002 pp. A694-A698.

Jayaprakash, et al., "On the Electrochemical Behavior of $LiM_xFe_{1-x}PO_4$ [PO4[M=Cu, Sn; X=0.02] Anodes—An Approach to Enhance the Anode Performance of $LiFePO_4$ Material," *Electrochemistry Communications*, 9, 2007, pp. 620-628.

Legagneur et al., "$LiMBO_3$ (M=Mn, Fe, Co): Synthesis, Crystal Structure and Lithium Deinsertion/Insertion Properties," *Solid State Ionics*, 139, 2001, pp. 37-46.

Letter to the Editor, "Chemical Oxidation of LiCoPO4," *Journal of Power Sources*, 183, 2004, pp. 281-282.

Liaw et al., "Synthesis and Electrochemical Property of Metal Oxide Cocrystalization on Nano-Olivine Particles," *Materials Laboratories, Advanced Lithium Electrochemistry Corporation*, presentation in Kyoto, Japan, Nov. 15, 2006, 1 page.

Liu, et al., "Doping Effects of Zinc on $LiFePO_4$ Cathode Material for Lithium Ion Batteries," *Electrochemistry Communications*, 8, 2006, pp. 1553-1557.

Mikhailov, "The Co-Crystallization of Beryl-Structure Compounds in the $Al_2Be_3Si_6O_{18}$-Mg,Ca/F, C1 System," *Journal of Crystal Growth*, 275, 2005, pp. e861-e866.

Ni et al., "$LiFePO_4$ with Ions Prepared by Co-Precipitation Method," *Materials Letters*, 59, 2005, pp. 2361-2365.

Nyten et al., "The Lithium Extraction/Insertion Mechanism in $Li_2FeSiO_4$," *Journal of Materials Chemistry*, 2006, 16, pp. 2266-2272.

Scherson et al., "Batteries and Electrochemical Capacitors," *The Electrochemical Society Interface*, Spring 2006, pp. 17-22.

Taiwanese Patent Application No. 094115023, filed on May 10, 2005, 27 pages.

Teng et al., "Electrochemical Properties of $LiFe_{0.9}Mg_{0.1}PO_4$/Carbon Cathode Materials Prepared by Ultrasonic Spray Pyrolysis," *Solid State Communications*, 142, 2007, pp. 389-392.

U.S. Appl. No. 11/764,629, filed Jun. 18, 2007, 25 pages.

U.S. Appl. No. 11/940,276, filed Nov. 14, 2007, 72 pages.

Wang et al., "Synthesis and Characterization of $LiFePO_4$ and $LiUTi_{0.01}Fe_{0.99}PO_4$ Cathode Materials," *Journal of Electrochemical Society*, 152, 1, 2006, pp. A25-A31.

Wang, et al., "Electrochemical Properties $TiP_2O_7$ and $LiTi_2(PO_4)_3$ as Anode Material for Lithium Ion Battery with Aqueous Solution Electrolyte," *Electrochimica Acta* 52, 2007, pp. 3280-3285.

Wang, et al., "Improving the Rate Performance of $LiFePO_4$ by Fe-Site Doping," *Electrochimica Acta*, 50, 2005, pp. 2955-2958.

Wen et al., "Structure and Properties of $LiFe_{0.9}V_{0.1}PO_4$," *Journal of Alloys and Compounds*, 416, 2006, pp. 206-208.

Yin et al, "Charge Ordering in Lithium Vanadium Phosphates: Electrode Materials for Lithium-Ion Batteries," *Journal of American Chemical Society*, 2003, 125, p. 326-327.

Yu et al., "Properties and Structure of Sodium-Iron Phosphate Glasses," *Journal of Non-Crystalline Solids*, 215, 1997, pp. 21-31.

Zhou, et al., "The Li Intercalation Potential of $LiMPO_4$ and $LiMSiO_4$ Olivines with M=Fe, Mn, Co. Ni," *Electrochemistry Communications*, 6, 2004, pp. 1144-1148.

Liu et al., "The Novel Composite $LiFePO_4$/MO Composite Cathode Materials for Lithium Ion Batteries," *Advanced Lithium Electrochemistry Co.*, No. 2-1. Xinghua Road., Taoyuan City, Taoyuan County 330, Taiwan, Nov. 16, 2006, 1 page.

"Advanced Phosphate-Based Active Materials," *Valence Technology*, date unknown, pp. 1-4.

* cited by examiner

US 7,887,954 B2

ELECTROCHEMICAL COMPOSITION AND ASSOCIATED TECHNOLOGY

CROSS-REFERENCE TO RELATED APPLICATIONS

This application is a continuation-in-part of the following applications: (1) U.S. patent application Ser. No. 11/747,746, filed on May 11, 2007, which is a continuation-in-part of U.S. patent application Ser. No. 11/510,096, filed on Aug. 25, 2006, which is a continuation-in-part of U.S. patent application Ser. No. 11/222,569, filed on Sep. 9, 2005, now abandoned, which claimed priority to Taiwanese Application No. 094115023, filed on May 10, 2005; and (2) U.S. patent application Ser. No. 11/518,805, filed on Sep. 11, 2006, which claims priority to Chinese Patent Application No. 200610080365.5, filed on May 11, 2006. This application is also related to U.S. patent application Ser. No. 11/764,686, filed on Jun. 18, 2007, which is a continuation-in-part of above-referenced U.S. patent application Ser. No. 11/747,746, and U.S. patent application Ser. No. 11/799,625, filed on May 2, 2007, which is a continuation-in-part of above-referenced U.S. patent application Ser. No. 11/222,569. This application is also related to copending U.S. patent application Ser. No. 11/940,276, filed on even date herewith, which is a continuation-in-part of U.S. patent application Ser. No. 11/764,629, filed on Jun. 18, 2007. Each of the aforementioned patent applications is incorporated herein by reference.

BACKGROUND

Many electrochemical applications and devices, such as electrochemical cells or batteries, for example, employ compositions that demonstrate electrochemical redox activity and/or are capable of participating in electrochemical redox reactions. Merely by way of example, secondary or rechargeable cells or batteries employing alkali ion compositions have generated considerable interest. Lithium ion batteries, for example, typically have a lithium ion electrolyte, a solid reductant as an anode, and a solid oxidant as a cathode, the latter typically being an electronically conducting host into which lithium ions are reversibly inserted from the electrolyte in the discharge stage and from which lithium ions are reversibly released back to the electrolyte in the charge stage. The electrochemical reactions taking place at the anode and the cathode are substantially reversible, rendering the battery substantially rechargeable. A rechargeable battery has been of considerable interest for applications involving power supplies, such as portable power supplies, such as those used in a variety of electronic products, medical devices, powered vehicles, and power tools, merely by way of example.

Various solid compositions have been investigated as possible compositions for use as electrochemical redox active electrode materials. Such compositions include those having a spinel structure, an olivine structure, a NASICON structure, and/or the like, for example. Some of these compositions have demonstrated insufficient conductivity, specific capacity or operability or have been linked with other negative associations, such as being expensive or difficult to produce or polluting to the environment, for example.

Development of compositions suitable for use in electrochemical redox reactions and/or suitable for use as electrode materials, methods of making same, uses of same, and/or associated technology is generally desirable.

SUMMARY

A composition for use in an electrochemical redox reaction is described herein. Such a composition may comprise a first material represented by a general formula $A_xM_yXO_4$, wherein in the general formula A represents at least one element selected from alkali metal elements, beryllium, magnesium, cadmium, boron, and aluminum; M represents at least one element selected from transition metal elements, zinc, cadmium, beryllium, magnesium, calcium, strontium, boron, aluminum, silicon, gallium, germanium, indium, tin, antimony, and bismuth; X represents at least one element selected from phosphorus, arsenic, silicon, and sulfur; O represents oxygen; x represents a number greater than 0 and less than or equal to about 1.4, and y represents a number of from about 0.6 to about 1.4 inclusive. Merely by way of example, when such a first material represented by the general formula $A_xM_yXO_4$ is placed in a solution comprising ionic A in the presence of a reference electrode and subjected to an ion-extraction or de-intercalation process, it may form $M_yXO_4$. The first material may be of an olivine structure. Such a composition may also comprise a second material selected from SiC, BN, carbon tube material, carbon fiber material, and an oxide of at least one element selected from transition metal elements, zinc, cadmium, beryllium, magnesium, calcium, strontium, boron, aluminum, silicon, gallium, germanium, indium, tin, antimony, and bismuth. Such a composition may be such that at least a portion of the second material is at least partially distributed within the first material. Such a composition may be such that at least a portion of the second material at least partially coats the first material. The coverage of the first material by the second material need not be complete to provide appropriate coating.

A composition for use in an electrochemical redox reaction may comprise a first material represented by a general formula $M_yXO_4$, wherein the first material is capable of being intercalated with ionic A to form $A_xM_yXO_4$, wherein A, M, X, O, x and y are as described above. Merely by way of example, when such a first material represented by the general formula $M_yXO_4$ is placed in a solution comprising ionic A in the presence of a reference electrode and subjected to an ion-insertion or intercalation process, it may form $A_xM_yXO_4$. The first material may be of an olivine structure. Such a composition may also comprise a second material selected from SiC, BN, carbon tube material, carbon fiber material, and an oxide of at least one element selected from transition metal elements, zinc, cadmium, beryllium, magnesium, calcium, strontium, boron, aluminum, silicon, gallium, germanium, indium, tin, antimony, and bismuth. Such a composition may be such that at least a portion of the second material is at least partially distributed within the first material. Such a composition may be such that at least a portion of the second material at least partially coats the first material. The coverage of the first material by the second material need not be complete to provide appropriate coating.

In a composition described herein, the second material may be present in any suitable amount, such as an amount from about 0.1 to about 5 percent by weight inclusive relative to the composition, for example. A composition described herein may comprise a carbonaceous material. In such a case, the carbonaceous material may be present in any suitable amount, such as an amount of less than or equal to 5 weight percent relative to the composition, for example. In a composition comprising a second material and/or a carbonaceous material, at least a portion of one or the other or both of these materials may be at least partially distributed within the first material. In a composition comprising a second material and/or a carbonaceous material, at least a portion of one or the other or both of these materials may at least partially coat the first material.

In a composition described herein, the first material may comprise aggregate particles. An individual aggregate particle may be microscale, such as greater than or equal to about 1 micrometer or such as from about 1 micrometer to about 50 micrometers, for example, in effective diameter. An individual aggregate particle may have a BET specific surface area in a range of from about 5 $m^2/g$ to about 100 $m^2/g$. An individual aggregate particle may comprise crystalline component particles. An individual component particle may be nanoscale, such as from about 10 to about 500 nanometers, for example, in effective diameter. In a composition comprising a second material and/or a carbonaceous material, at least a portion of one or the other or both of these materials may be at least partially distributed within an individual aggregate particle. In a composition comprising a second material and/or a carbonaceous material, at least a portion of one or the other or both of these materials may at least partially coat an individual aggregate particle.

A composition described herein may be useful in a variety of applications, environments, and devices. By way of example, an electrode, such as a cathode, for example, may comprise a composition described herein. Further by way of example, an electrochemical cell, such as a battery, for example, may comprise a composition described herein. A battery, such as a rechargeable battery, for example, may comprise an anode, an electrolyte, and a cathode made from a composition described herein.

These and various other aspects, features, and embodiments are further described herein. Any other portion of this application is incorporated by reference in this summary to the extent same may facilitate a summary of subject matter described herein, such as subject matter appearing in any claim or claims that may be associated with this application.

BRIEF DESCRIPTION OF THE DRAWINGS

A description of various aspects, features, embodiments, and examples is provided herein with reference to the accompanying drawings, which are briefly described below. The drawings may illustrate one or more aspect(s), feature(s), embodiment(s), and/or example(s) in whole or in part. The drawings are illustrative and are not necessarily drawn to scale.

Each of FIG. 8, FIG. 9, FIG. 10, FIG. 11, FIG. 12

Each of FIG. 14

DESCRIPTION

Figure 1:
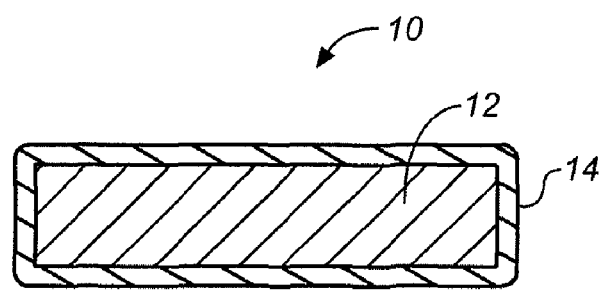
FIG. 1 is a schematic illustration of an electrode, as further described herein.

A composition suitable for use in an electrochemical redox reaction is described herein. A process of making such a composition is also described herein. Additionally, a description of various aspects, features, embodiments, and examples, is provided herein.

It will be understood that a word appearing herein in the singular encompasses its plural counterpart, and a word appearing herein in the plural encompasses its singular counterpart, unless implicitly or explicitly understood or stated otherwise. Further, it will be understood that for any given component described herein, any of the possible candidates or alternatives listed for that component, may generally be used individually or in any combination with one another, unless implicitly or explicitly understood or stated otherwise. Additionally, it will be understood that any list of such candidates or alternatives, is merely illustrative, not limiting, unless implicitly or explicitly understood or stated otherwise. Still further, it will be understood that any figure or number or amount presented herein is approximate, and that any numerical range includes the minimum number and the maximum number defining the range, whether the word "inclusive" or the like is employed or not, unless implicitly or explicitly understood or stated otherwise. Generally, the term "approximately" or "about" or the symbol "~" in reference to a figure or number or amount includes numbers that fall within a range of ±5% of same, unless implicitly or explicitly understood or stated otherwise. Yet further, it will be understood that any heading employed is by way of convenience, not by way of limitation. Additionally, it will be understood that any permissive, open, or open-ended language encompasses any relatively permissive to restrictive language, less open to closed language, or less open-ended to closed-ended language, respectively, unless implicitly or explicitly understood or stated otherwise. Merely by way of example, the word "comprising" may encompass "comprising"-, "consisting essentially of"-, and/or "consisting of"-type language.

All patents, patent applications, publications of patent applications, and other material, such as articles, books, specifications, publications, documents, things, and/or the like, referenced herein are hereby incorporated herein by this reference in their entirety for all purposes, excepting any of same or any prosecution file history associated with same that is inconsistent with or in conflict with the present document, or that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

Various terms may be generally described, defined, and/or used herein to facilitate understanding. It will be understood that a corresponding general description, definition, and/or use of these various terms applies to corresponding linguistic or grammatical variations or forms of these various terms. It will also be understood that a general description, definition, and/or uses or a corresponding general description, definition, and/or use, of any term herein may not apply or may not fully apply when the term is used in a non-general or more specific manner. It will also be understood that the terminology used herein, and/or the descriptions and/or definitions thereof, for the description of particular embodiments, is not limiting. It will further be understood that embodiments described herein or applications described herein, are not limiting, as such may vary.

Generally, the term "alkali metal element" refers to any of the metals in group IA of the periodic table, namely, lithium, sodium, potassium, rubidium, cesium, and francium. Generally, the term "transition metal element" refers to any of the elements 21 to 29 (scandium through copper), 39 through 47 (yttrium through silver, 57-79 (lanthanum through gold), and all known elements from 89 (actinium) onwards, as numbered in the periodic table. Generally, the term "first row transition metal element" refers to any of the elements 21-29, namely, scandium, titanium, vanadium, chromium, manganese, iron, cobalt, nickel, and copper; the term "second row transition metal element" refers to any of the elements 39-47, namely, yttrium, zirconium, niobium, molybdenum, technetium, ruthenium, rhodium, palladium, and silver; and the term "third row transition metal element" refers to any of the elements 57-79, namely, lanthanum, hafnium, tantalum, tungsten, rhenium, osmium, iridium, platinum, and gold. Generally, the term "oxide" refers to a mineral in which at least one elemental atom, such as a metallic atom, for example, is bonded to at least one oxygen atom.

Generally, the term "electrode" refers to a working electrode at which a material is electrooxidized or electroreduced. Anodes and cathodes are examples of electrodes. Generally, other specific electrodes, such as reference electrodes, are specified as such herein. Generally, the term "electrochemical cell" refers to a cell at which an electrochemical reaction may take place. Electrochemical fuel cells, power cells, and batteries are examples of electrochemical cells.

Generally, the term "nanoscale" or "nanometer-sized" refers a characteristic of a material, namely, that of being composed of particles, the effective diameter of an individual particle of which is less than or equal to about 500 nanometers, such as from about 10 nanometers to about 500 nanometers, inclusive, or from about 200 nanometers to about 500 nanometers, or from about 300 nanometers to about 500 nanometers, for example. Generally, the term "microscale" or "micrometer-sized" refers a characteristic of a material, namely, that of being composed of particles, the effective diameter of an individual particle of which is from about 1 micrometer to about 100 micrometers, inclusive, such as from above about 1 micrometer to about 50 micrometers, or from about 10 micrometers to about 50 micrometers, for example.

A composition suitable for use in an electrochemical redox reaction is now described. Such a composition may comprise a first material represented by a general formula I: $A_xM_yXO_4$, which is further described below.

In the general formula I, A represents at least one element selected from alkali metal elements, beryllium, magnesium, cadmium, boron, and aluminum. Examples of some suitable alkali metal elements include lithium, sodium, and potassium. As mentioned previously, batteries employing alkali ion compositions, such as lithium ion compositions, have been the subject of considerable interest. Accordingly, an example of a suitable alkali metal element is lithium, as further demonstrated herein.

In the general formula I, M represents at least one element selected from transition metal elements, zinc, cadmium, beryllium, magnesium, calcium, strontium, boron, aluminum, silicon, gallium, germanium, indium, tin, antimony, and bismuth. Examples of some suitable transition metal elements include first row transition metal elements, second row transition metal elements, and third row transition metal elements. An example of a suitable first row transition metal element is iron. Further, in the general formula I, X represents at least one element selected from phosphorus, arsenic, silicon, and sulfur, and O represents oxygen.

In the general formula I, x represents a number from greater than 0 to less than or equal to about 1.4, such as from about 0.4 to about 1.2 inclusive, about 0.6 to about 1.2 inclusive, or about 0.8 to 1.2 inclusive, for example. When A represents more than one element, the x of $A_x$ represents a number that is the total of each of the numbers associated with each of those elements. For example, if A represents Li, Na, and K, the x1 of $Li_{x1}$ represents a first number, the x2 of $Na_{x2}$ represents a second number, and the x3 of $K_{x3}$ represents a third number, such that $A_x$ represents $Li_{x1}Na_{x2}K_{x3}$, then the x of $A_x$ represents the sum of the first number represented by x1, the second number represented by x2, and the third number represented by x3. In the general formula I, y represents a number from about 0.6 to about 1.4 inclusive, such as from about 0.8 to about 1.2 inclusive, for example. For example, if M represents Fe and Co, the y1 of $Fe_{y1}$ represents a first number, and the y2 of $Co_{y2}$ represents a second number, such that $M_y$ represents $Fe_{y1}Co_{y2}$, then the y of $M_y$ represents the sum of the first number represented by y1 and the second number represented by y2. The number represented by x and the number represented by y in the general formula I may be determined by a suitable technique, such as atomic emission spectrometry (AES) that relies on inductively coupled plasma (ICP), for example. See Gladstone et al., *Introduction to Atomic Emission Spectrometry*, ICP Optical Emission Spectroscopy, Technical Note 12. Merely for purposes of convenience or simplicity, each of x and y of general formula I described herein may appear as representing the number 1, while still maintaining its broader meaning.

A suitable composition may also comprise second material selected from SiC, BN, carbon tube material, carbon fiber material, and an oxide of at least one element selected from transition metal elements, zinc, cadmium, beryllium, magnesium, calcium, strontium, boron, aluminum, silicon, gallium, germanium, indium, tin, antimony, and bismuth. As to the oxide, examples of some suitable transition metal elements include first row transition metal elements, second row transition metal elements, and third row transition metal elements; examples of suitable first row transition metal elements include titanium, vanadium, chromium, manganese, cobalt, nickel, and copper; examples of other suitable elements include zinc, magnesium, aluminum, and silicon; and an example of a suitable combination of elements includes zinc and aluminum, merely by way of example.

A composition described herein may be such that the first material represented by the general formula I described above and the second material are in a layered configuration. For example, the first material may form a core and the second material may form a layer or a coating that at least partially surrounds, layers, and/or coats the core. The coverage of an underlying material by a layer or coating need not be complete to show appropriate layering or coating. Such a composition may be represented by a general formula II: $A_xM_yXO_4/B$, wherein A, M, X, O, x and y are as described above in connection with the first material represented by general formula I, B represents the second material described above, and the symbol, /, represents a layered relationship between the first material and the second material. The composition may be such that at least a portion of the second material is at least partially distributed within the first material. An amount of a second material, B, in the composition may be any suitable amount, such as any suitable amount according to properties desired or needs of an application. An example of a suitable amount of the second material is from about 0.1 to about 5 percent by weight relative to the composition, merely by way of example.

A composition described herein may also comprise at least one carbonaceous material. A suitable carbonaceous material may be conductive, such as polyacetylene, for example, semi-conductive, such as poly-phenylyenevinylene, for example, or non-conductive, such as octane, for example. In such a case, the composition may be represented by a general formula III: $A_xM_yXO_4/B//C$, wherein A, M, X, O, x and y are as described above in connection with the first material represented by general formula I; B represents the second material described above, and the "/" symbol represents a layered relationship between the first material and the second material; C represents the carbonaceous material, and the "//" symbol is used merely as a convenience. The composition may be such that at least a portion of the carbonaceous material at least partially coats the first material. The composition may be such that at least a portion of the second material and/or the carbonaceous material is at least partially distributed within the first material.

A carbonaceous material may serve to enhance the conductivity of the composition. An amount of carbonaceous material in the composition may be any suitable amount, such as any suitable amount according to properties desired or needs of an application. An example of a suitable amount of the carbonaceous material is from less than or equal to about 5 percent by weight relative to the composition, such as from about 0.1 to about 5 weight percent relative to the composition, merely by way of example.

The first material of a composition described herein may comprise aggregate particles. An individual aggregate particle may be microscale, such as greater than or equal to about 1 micrometer, such as from about 1 micrometer to about 50 micrometers, for example, in effective diameter. An individual aggregate particle may have a BET specific surface area in a range of from about 5 to about 100 m$^2$/g. An individual aggregate particle may comprise crystalline component particles. An individual component particle may be nanoscale, such as from about 10 to about 500 nanometers, for example, in effective diameter. When a composition described herein comprises a carbonaceous material, carbon particles of the carbonaceous material may adhere to surfaces of the crystalline component particles that form an individual aggregate particle.

As mentioned above, a composition for use in an electrochemical redox reaction may comprise a material represented by a general formula $M_yXO_4$, wherein the material is capable of being intercalated with ionic A to form $A_xM_yXO_4$, wherein A, M, X, O, x and y are as described above. For such a composition, general formulas I, II and II may take the form of corresponding general formula I: $M_yXO_4$; general formula II: $M_yXO_4/B$; and general formula III: $M_yXO_4/B//C$, respectively, where M, X, O, B, C, and y are as described above. Merely by way of example, when such a material is placed in a solution comprising ionic A in the presence of a reference electrode and subjected to an ion-insertion or intercalation process, it may form $A_xM_yXO_4$, $A_xM_yXO_4/B$, or $A_xM_yXO_4/B//C$, respectively. Further, merely by way of example, when a material represented by the general formula $A_xM_yXO_4$, $A_xM_yXO_4/B$, or $A_xM_yXO_4/B//C$ is placed in a solution comprising ionic A in the presence of a reference electrode and subjected to an ion-extraction or de-intercalation process, it may form $M_yXO_4$, $M_yXO_4/B$, or $M_yXO_4/B//C$, respectively.

A composition described herein may be useful in a variety of applications, environments, and devices. By way of example, an electrode, such as a cathode, for example, may comprise a composition described herein. Further by way of example, an electrochemical cell, such as a battery, for example, may comprise a composition described herein. Examples of suitable compositions, applications, environments, and devices are provided herein, after a description of a process for preparing a composition, as now described.

A process of preparing a composition for use in an electrochemical redox reaction may comprise preparing an aqueous solution comprising ionic A, ionic M, and ionic PO$_4$. The aqueous solution may comprise the ionic components just mentioned and deionized water, for example. The solution and a material comprising at least one element selected from transition metal elements, zinc, cadmium, beryllium, magnesium, calcium, strontium, boron, aluminum, silicon, gallium, germanium, indium, tin, antimony, and bismuth, in any suitable form, such as a salt form, for example, may be combined. The pH of the solution may be adjusted in any suitable manner, such as via the addition of an ammonia solution to the combination just described, for example. Such a pH adjustment may facilitate the formation of a hydroxide comprising the at least one element just described. Such a pH adjustment may facilitate at least partial conversion, such as substantial conversion, for example, of a hydroxide comprising the at least one element just described to an oxide comprising the at least one element just described. This oxide may be that associated with the oxide component B described above. The solution comprising the oxide component may be heated to form a suitable composition for use in an electrochemical redox reaction. The composition may comprise fine particles of the oxide component dispersed in an aggregation of $A_xM_yPO_4$ particles and/or coated on surfaces of $A_xM_yPO_4$ particles.

A process of preparing a composition for use in an electrochemical redox reaction may comprise preparing a powdered material $A_xM_yPO_4$. The powdered material and a solution comprising at least one element selected from transition metal elements, zinc, cadmium, beryllium, magnesium, calcium, strontium, boron, aluminum, silicon, gallium, germanium, indium, tin, antimony, and bismuth, in any suitable form, such as a salt form, for example, may be combined. The pH of the solution may be adjusted in any suitable manner, such as via the addition of an ammonia solution to the combination just described, for example. Such a pH adjustment may facilitate the formation of a hydroxide comprising the at least one element just described. Such a pH adjustment may facilitate the dispersion, such as substantially uniform dispersion, for example, of particles of a hydroxide comprising the at least one element just described in particles of the powdered material and/or on surfaces of particles of the powdered material. The pH adjustment may be based on any suitable factor(s) and/or consideration(s), such as a consideration of pH of the solution and/or the solubility characteristics of the hydroxide, for example. Reducing or minimizing the solubility of the hydroxide may facilitate the dispersion of particles of the hydroxide on surfaces of particles of the powdered material. The solution may be filtered to remove the filtrate and obtain a solid product. The solid product may be dried to obtain a composition as a solid powder. The solid powder may be heated to or at a temperature in a range of from about 50 to about 900° C. to form a suitable composition for use in an electrochemical redox reaction. The heating may be such that the hydroxide is at least partially converted, such as substantially converted, for example, to the oxide component of the composition. Aspects of the heating process, such as the temperature used, for example, may be based on any suitable factor(s) and/or consideration(s), such as the characteristics of the oxide component. The composition may comprise fine particles of the oxide component dispersed in an aggregation of $A_xM_yPO_4$ particles and/or coated on surfaces of $A_xM_yPO_4$ particles.

As mentioned above, the second material described herein may be a material other than an oxide, such as SiC, BN, carbon tube material, or carbon fiber material, for example. A method of preparing a composition described herein, wherein the second material is SiC, is provided in Example 10 herein. A similar method may be used to prepare a composition described herein, wherein the second material is BN, carbon tube material, or carbon fiber material. Such a method may comprise replacing the SiC used in a method such as that described in Example 10 with a suitable amount of BN, carbon tube material, or carbon fiber material, respectively, such as a stoichiometric amount of the replacement component, for example.

A first material represented by general formula I: $A_xM_yXO_4$ may be manufactured by a method comprising forming particulate precursors of the first material, crystallizing the first material of the particulate precursors to form crystalline nanometer-sized primary particles, and sintering the crystalline nanometer-sized primary particles. For example, such a method may comprise preparing a reactant solution comprising the first material and optionally a carbonaceous component, and drying the reactant solution to form particulate precursors of the first material. Any suitable drying process, such as dehydration, spray-drying, ultrasonic spray-drying, freeze-drying, vacuum-drying, filtering, and/or spray pyrolysis, for example, may be used to dry the reactant solution.

The particulate precursors may be heated in the presence of suspended carbon particles. The heating may occur in a non-oxidizing atmosphere. Any suitable heating process, such as a heating process conducted at a temperature in a range of from about 400° C. to about 900° C. for from about 6 to about 48 hours, for example, may be used. Such heating may result in the first material of each of the particulate precursors crystallizing such that crystalline nanometer-sized primary particles are formed. Such heating may result in the sintering of surface portions of adjacent crystalline nanometer-sized primary particles that contact one another such that micrometer-sized secondary particles are formed. The method just described may result in a first material represented by general formula I: $A_xM_yPO_4$ in a powdered form.

A first material represented by general formula I: $A_xM_yXO_4$ may be manufactured by a method comprising forming particulate precursors of the first material, heating the particulate precursors to form the crystalline nanometer-sized primary particles, granulating the crystalline nanometer-sized primary particles to form micrometer-sized secondary particles, and then sintering the crystalline nanometer-sized primary particles of each of the micrometer-sized secondary particles.

In such a method, a reactant solution comprising the first material represented by general formula I: $A_xM_yPO_4$ and optionally a carbonaceous component may be prepared and dried to form particulate precursors of the first material. Any suitable drying process, such as dehydration, spray-drying, ultrasonic spray-drying, freeze-drying, vacuum-drying, filtering, and/or spray pyrolysis, for example, may be used to dry the reactant solution.

The particulate precursors may be heated in the presence of suspended carbon particles. The heating may occur in a non-oxidizing atmosphere. Any suitable heating process, such as a heating process conducted at a temperature in a range of from about 550° C. to about 600° C. for from about 2 to about 24 hours, for example, may be used. Such heating may result in the first material of each of the particulate precursors crystallizing such that crystalline nanometer-sized primary particles are formed.

The crystalline nanometer-sized primary particles may be granulated. The granulation may be such that micrometer-sized secondary particles are formed. The micrometer-sized secondary particles may be heated in the presence of suspended carbon particles. The heating may occur in a non-oxidizing atmosphere. Any suitable heating process, such as a heating process conducted at a temperature in a range of from about 400° C. to about 900° C. for from about 6 to about 48 hours, for example, may be used. Such heating may result in the sintering of surface portions of adjacent crystalline nanometer-sized primary particles that contact one another. The method just described may result in a first material represented by general formula I: $A_xM_yPO_4$ in a powdered form.

An optional carbonaceous material may be employed in a process of preparing the first material in a powdered form as described above. A suitable carbonaceous component may comprise at least one organic acid selected from citric acid, oxalic acid, tartaric acid, lactic acid, terephthalic acid, ethylenediaminetetraacetic acid, and acetic acid; at least one carbohydrate selected from sucrose, lactose, glucose, and oligose; and/or at least one carbonaceous powder made from a material selected from acetylene carbon black, carbon black, mesophase carbon micro beads (MCMB), Super P or Super P Li carbon-based conductive material (Timcal Ltd., Switzerland), and graphite.

A suitable composition for use in an electrochemical redox reaction may be prepared from the first material represented by general formula I: $A_xM_yPO_4$ or a general formula: $M_yPO_4$, as described herein, and the second material in any suitable manner.

An electrode may be prepared from a composition represented by general formula II: $A_xM_yPO_4/B$ or by general formula III: $A_xM_yPO_4/B//C$, as described herein. An electrode may be prepared from a composition represented by a general formula: $M_yPO_4/B$ or by a general formula: $M_yPO_4/B//C$, as described herein. Such an electrode is schematically illustrated in FIG. 1. As shown, the electrode 10, which may be a cathode, for example, comprises an electrode plate 12 and a coating 14 that at least partially covers the electrode plate. The coating may comprise the first material represented by general formula I: $A_xM_yPO_4$, or by general formula:

$A_xM_yPO_4$, such as the first material in a powder form, for example. The coating may comprise that first material, an aqueous binder, such as styrene-butadiene rubber (SBR), for example, and an aqueous solvent, such as deionized water, for example. The coating may comprise that first material, a non-aqueous binder, such as polyvinylidene fluoride (PVDF), for example, and an non-aqueous solvent, such as N-methyl-pyrrolidone (NMP). The coating may comprise a thickener, such as carboxymethyl cellulose (CMC), for example.

An electrochemical cell may comprise at least one electrode such as that just described. For example, an electrochemical may comprise a cathode prepared from the first material, as described above, an anode, and an electrolyte. Such an electrochemical cell may comprise a rechargeable battery.

The Examples set forth below generally describe some of the composite compositions prepared, various methods used to prepare them, various techniques used to evaluate them, and various parameters used for those techniques. Appropriate variations and modifications as to all of these are contemplated herein.

EXAMPLES

Example 1

Composite Material $LiFePO_4/ZnO//C$

Phosphoric acid (4050 g) and citric acid (0.25 mole) were mixed and dissolved in deionized water (15 l) to form an acidic solution. Iron powders (99%, Strem Chemicals Inc., Newburyport, Mass., U.S.A.) (1080 g) were added to and completely dissociated in the acidic solution, resulting in an acidic solution comprising ferric phosphate and ferrous phosphate. Zinc chloride (485 g) was then added to and dispersed in the acidic solution with agitation by a mixer to form a resulting acidic solution.

Lithium hydroxide (1500 g) was dissolved in water (15 l) to form a basic solution. The basic solution was added to the resulting acidic solution to form a combined solution. The pH of the combined solution was adjusted to 8.5 using an ammonia-and-water solution. This pH was broadly considered to be "neutral." The zinc chloride in the solution dissociated to form zinc hydroxide as a result of the pH adjustment or neutralization and the resulting zinc hydroxide was converted to zinc oxide as a result of the heat generated from the exothermic neutralization.

The pH-adjusted combined solution was spray-dried to form a fine powder precursor. The fine powder precursor was placed in an aluminum oxide crucible, which was in turn placed in a furnace. Carbon powder was also placed in the furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. In the furnace, carbon particles from the carbon powder were suspended in the nitrogen carrier gas and mixed with the precursor to produce a composite material, $LiFePO_4/ZnO//C$, in a powder form.

It is believed that the composite material comprised aggregate particles of lithium ferrous phosphate particles dispersed with zinc oxide and carbonaceous material and/or coated by zinc oxide and carbonaceous material. It is believed that an individual aggregate particle was greater than one micrometer in effective diameter. It is believed that an individual aggregate particle comprised crystalline component particles. It is believed that an individual component particle was from about 10 to about 500 nanometers in effective diameter.

A 2032-type button rechargeable battery was prepared using the composite material. The electrochemical characteristics of the battery, including galvanostatic charge and discharge characteristics, were studied. Generally, an electrode for a battery was made by dispersing 80 weight percent of the active composite material, 10 weight percent carbon black, and 10 weight percent polyvinylidene fluoride (PVDF) to form a mixture; coating an aluminum foil with the mixture; and drying the coated aluminum foil to produce an electrode. The electrode was employed as a cathode and combined with a lithium foil counter electrode to form the battery. The electrolyte was $LiPF_6$ (1 M) in a 1:1 by volume mixture of ethylene carbonate (EC) and dimethyl carbonate (DMC) (LI-PASTE-EDEC/PF1, Tomiyama Pure Chemical Industry, Japan). The battery was subjected to galvanostatic charge and discharge tests using a Maccor Series 4000 Automated Test System (Maccor Inc., Tulsa, Okla., U.S.A.). In these tests, the applied charge/discharge potential was in a range from 2.8 V to 4.0 V, the charge/discharge rate was set to C/5, and the temperature was maintained at room temperature.

Example 2

Comparative Material $LiFePO_4$

Lithium hydroxide (4.196 g), ferrous oxalate (17.99 g), phosphate (11.53 g) and deionized water (200 ml) were combined to form a solution. The solution was mixed thoroughly and then dried to form a fine powder. The fine powder was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A comparative material, $LiFePO_4$, in a powder form was obtained.

A 2032-type button rechargeable battery was prepared using the comparative material. The electrochemical characteristics of the battery, including galvanostatic charge and discharge characteristics, were studied. Generally, an electrode for the battery was made by dispersing 80 weight percent of the comparative material, 10 weight percent carbon black, and 10 weight percent polyvinylidene fluoride (PVDF) to form a mixture; coating an aluminum foil with the mixture; and drying the coated aluminum foil to produce an electrode. The electrode was employed as a cathode and combined with a lithium foil counter electrode to form the battery. The battery was then subjected to galvanostatic charge and discharge tests using a Maccor Series 4000 Automated Test System (Maccor Inc., Tulsa, Okla., U.S.A.). In these tests, the applied charge/discharge potential was in a range from 2.8 V to 4.0 V, the charge/discharge rate was set to C/5, and the temperature was maintained at room temperature.

Results from Example 1 and Example 2

Figure 2:
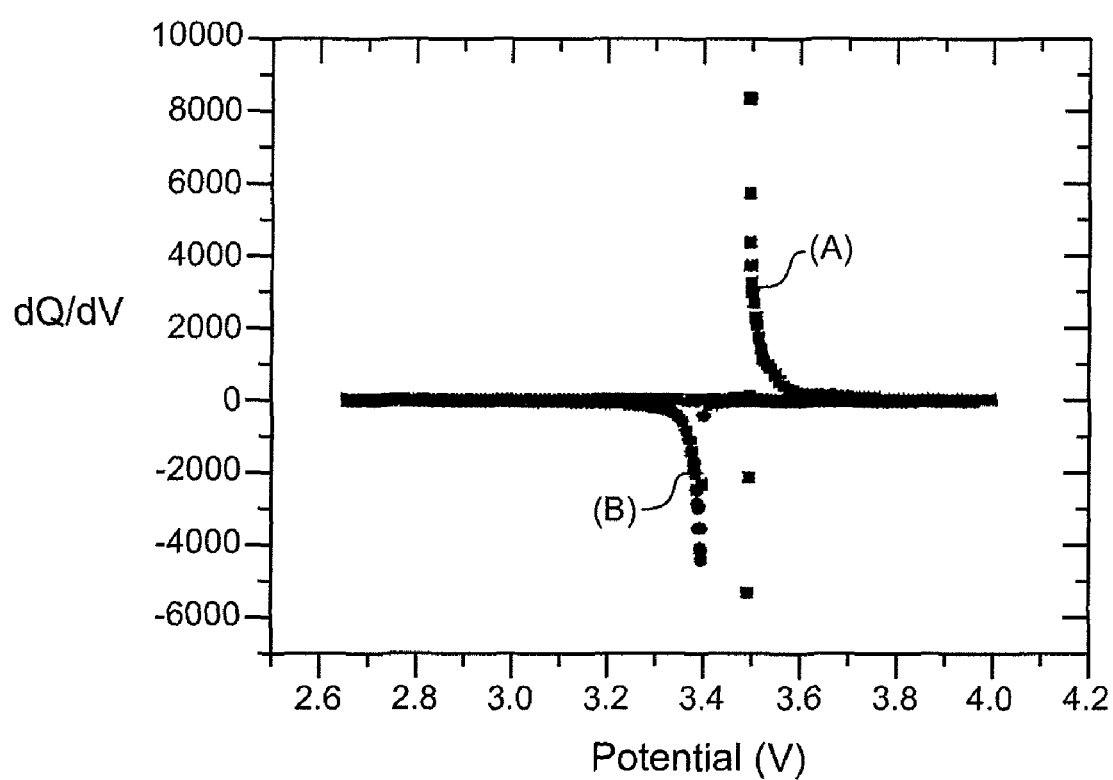
FIG. 2 is a graphical representation of differential capacity (dQ/dV) versus potential (V) associated with a rechargeable battery comprising an electrode prepared using a composite material, as further described herein.
Figure 3:
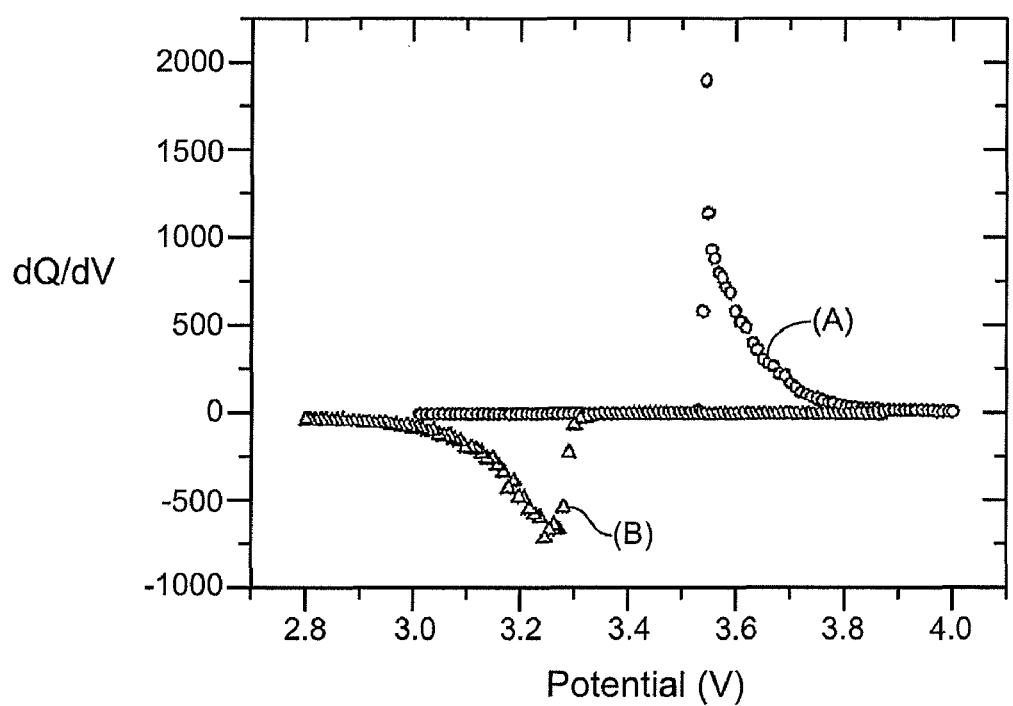
FIG. 3 is a graphical representation of differential capacity (dQ/dV) versus potential (V) associated with a rechargeable battery comprising an electrode prepared using a comparative material, as further described herein.

A graphical representation of the differential capacity (dQ/dV) versus potential (V) for the rechargeable battery from Example 1 comprising the composite material, $LiFePO_4/ZnO//C$, is shown in FIG. 2. A graphical representation of the differential capacity (dQ/dV) versus potential (V) for the rechargeable battery from Example 2 comprising the comparative material, $LiFePO_4$, is shown in FIG. 3. The charge peak (curve A) and the discharge peak (curve B) in FIG. 2 are relatively close to one another at about 3.5 V and 3.4 V, respectively. It is believed that this indicates that the battery comprising the composite material, LiFePO$_4$/ZnO//C, has relatively good electrochemical reversibility. The charge peak (curve A) and the discharge peak (curve B) in FIG. 3 are relatively far from one another at about 3.55 V and 3.25 V, respectively. It is believed that this indicates that the battery comprising the comparative material, LiFePO$_4$, has relatively poor electrochemical reversibility.

Example 3

Composite Material LiFePO$_4$/ZnAlO$_z$//C

Phosphoric acid (2880 g) and citric acid (313 g) were mixed and dissolved in deionized water (10 l) to form an acidic solution. Iron powders (99%, Strem Chemicals Inc., Newburyport, Mass., U.S.A.) (1396 g) were added to and completely dissociated in the acidic solution, resulting in an acidic solution comprising ferric phosphate and ferrous phosphate. It is believed that citric acid may accelerate the dissociation of the iron powders and formation of ferric phosphate and ferrous phosphate. Lithium hydroxide (1049 g) was dissolved in water (10 l) to form a non-acidic solution. The non-acidic solution was added to the acidic solution to form a combined solution.

The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 700° C. at a rate of 5° C./minute and was maintained at 700° C. for 8 hours. The furnace was then cooled to room temperature. A powdered material, LiFePO$_4$, was obtained.

Zinc chloride (1.4 g) and aluminum chloride (1.2 g) were dissolved in water (150 ml) to form a solution. The resulting solution was combined with the powdered LiFePO$_4$ material to form a slurry. The pH of the slurry was adjusted from 4.5 to 8.5 using an ammonia-and-water solution (15 ml) and then filtered. A resulting filtered cake material was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, LiFePO$_4$/ZnAlO$_z$//C, in a powder form was obtained. While the composite material was not tested to determine a numerical value for z, it is believed that z may represent any number of oxygen atoms suitable for balancing the valences of the zinc and aluminum elements in zinc aluminum oxide component of the composite material.

It is believed that the composite material comprised aggregate particles of lithium ferrous phosphate particles dispersed with zinc aluminum oxide and carbonaceous material and/or coated by zinc aluminum oxide and carbonaceous material. It is believed that an individual aggregate particle was greater than one micrometer in effective diameter. It is believed that an individual aggregate particle comprised crystalline component particles. It is believed that an individual component particle was from about 10 to about 500 nanometers in effective diameter. The carbonaceous material dispersed in and/or coating the aggregate particles was obtained from the citric acid component. It is believed that the carbonaceous material had a non-conductive sp$^3$ structure. It is believed that the effect of the zinc aluminum oxide component on the electrochemical properties of the composite material produced may be measured without interference from the carbonaceous material.

A 2032-type button rechargeable battery was prepared using the composite material. The electrochemical characteristics of the battery, including galvanostatic charge and discharge characteristics, were studied. Generally, an electrode for a battery was made by dispersing 80 weight percent of the active composite material, 10 weight percent carbon black, and 10 weight percent polyvinylidene fluoride (PVDF) to form a mixture; coating an aluminum foil with the mixture; and drying the coated aluminum foil to produce an electrode. The electrode was employed as a cathode and combined with a lithium foil counter electrode to form the battery. The electrolyte was LiPF$_6$ (1 M) in a 1:1 by volume mixture of ethylene carbonate (EC) and dimethyl carbonate (DMC) (LI-PASTE-EDEC/PF1, Tomiyama Pure Chemical Industry, Japan). The battery was subjected to galvanostatic charge and discharge tests using a Maccor Series 4000 Automated Test System (Maccor Inc., Tulsa, Okla., U.S.A.). In these tests, the applied charge/discharge potential was in a range from 2.8 V to 4.0 V, the charge/discharge rate was set to C/5, and the temperature was maintained at room temperature.

Results from Example 2 and Example 3

Figure 4:
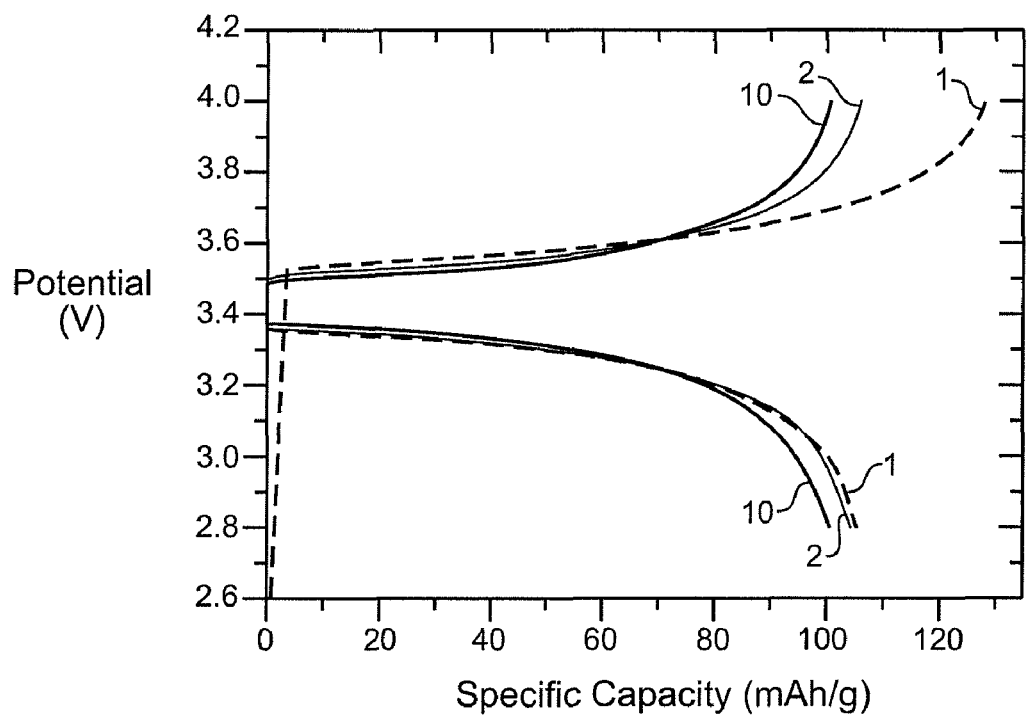
FIG. 4 is a graphical representation of potential (V) versus specific capacity associated with a rechargeable battery comprising an electrode prepared using a composite material, as further described herein.
Figure 5:
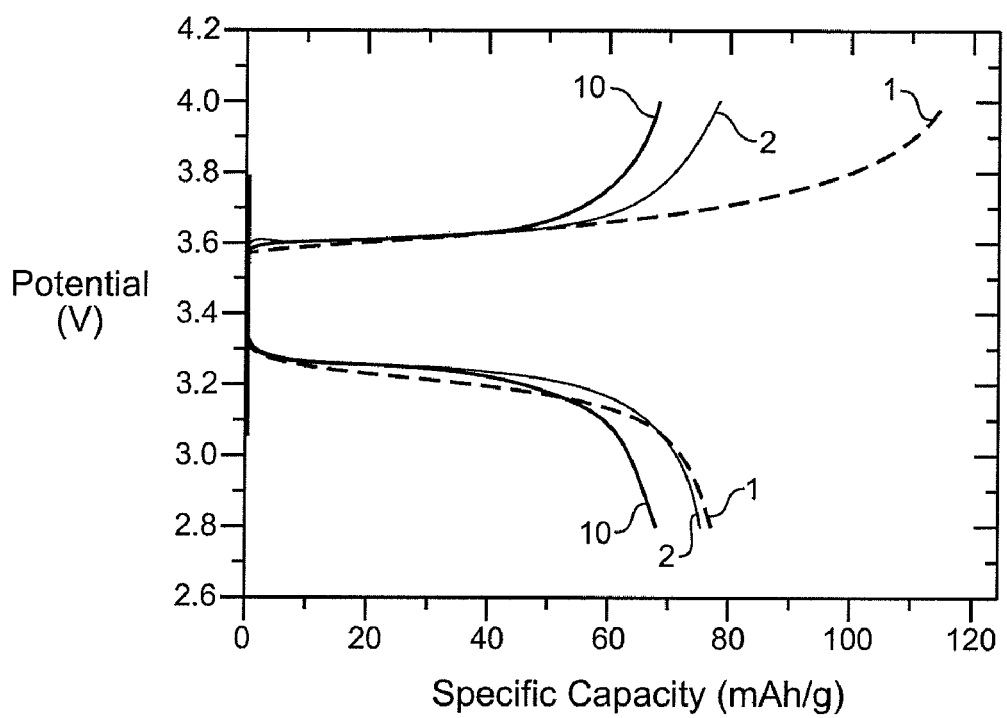
FIG. 5 is a graphical representation of potential (V) versus specific capacity associated with a rechargeable battery comprising an electrode prepared using a comparative material, as further described herein.

A graphical representation of potential (V) versus specific capacity (mAh/g) for the rechargeable battery from Example 3 comprising the composite material, LiFePO$_4$/ZnAlO$_z$//C, is shown in FIG. 4. A graphical representation of potential (V) versus specific capacity (mAh/g) for the rechargeable battery from Example 2 comprising the comparative material, LiFePO$_4$, is shown in FIG. 5. As shown in FIG. 4, for the rechargeable battery comprising the composite material, LiFePO$_4$/ZnAlO$_z$//C, the specific capacity of the initial discharge curve (lower curve 1, one charge/discharge cycle) reached about 105 mAh/g and the specific capacity of the tenth discharge curve (lower curve 10, ten charge/discharge cycles) reached about 101 mAh/g. As shown in FIG. 5, for the rechargeable battery comprising the comparative material, LiFePO$_4$, the specific capacity of the initial discharge curve (lower curve 1, one charge/discharge cycle) reached about 78 mAh/g and the specific capacity of the tenth discharge curve (lower curve 10, ten charge/discharge cycles) reached about 68 mAh/g. It is believed that these results demonstrate that the specific capacity characteristics of the composite material battery were much better than those of the comparative material battery.

The composite material of Example 3 was prepared without the presence of carbon particles in the furnace during heat treatment. It is believed that the composite material of Example 3 comprises residual ferric ions since the heat treatment used is believed to be insufficient to completely reduce ferric ions to ferrous ions. It is believed that such residual ferric ions in the composite material reduce the specific capacity of the rechargeable battery comprising the composite material. It is believed that if carbon particles (suitable reducing agents) were present in the furnace during heat treatment, reduction of ferric ions to ferrous ions would be greater or possibly complete, such that the specific capacity characteristics of a composite material battery comprising a "more-reduced" composite material would be better than those of the composite material battery actually tested in Example 3.

Example 4

Composite Material LiFePO$_4$/CuO//C

Phosphoric acid (11.5 g), citric acid (1 g) and sucrose (1 g) were mixed and dissolved in deionized water (100 ml) to form an acidic solution. Iron powders (99%, Strem Chemicals Inc., Newburyport, Mass., U.S.A.) (5.6 g) were added to and completely dissociated in the acidic solution, resulting in an acidic solution comprising ferric phosphate and ferrous phosphate. Copper nitrate (0.72 g) was then added to the acidic solution to form a resulting acidic solution.

Lithium hydroxide (4.2 g) was dissolved in water (100 ml) to form a non-acidic solution. The non-acidic solution was added to the acidic solution to form a combined solution. The pH of the combined solution was slightly less than 7. The pH of the combined solution was adjusted about 8 using an ammonia-and-water solution.

The pH-adjusted combined solution was dried to form a fine powder precursor. The fine powder precursor was placed in an aluminum oxide crucible, which was in turn placed in a furnace. Carbon powder was also placed in the furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. In the furnace, carbon particles from the carbon powder were suspended in the nitrogen carrier gas and mixed with the precursor to produce a composite material, LiFePO$_4$/CuO//C, in a powder form.

It is believed that the composite material comprised aggregate particles of lithium ferrous phosphate particles dispersed with copper oxide and carbonaceous material and/or coated by copper oxide and carbonaceous material. An individual aggregate particle was greater than one micrometer in effective diameter. It is believed that an individual aggregate particle comprised crystalline component particles. An individual component particle was from about 10 to about 500 nanometers in effective diameter. It is believed that a carbonaceous material at least partially coated or adhered to the outside of an individual aggregate particle. The carbonaceous material dispersed in and/or coating the aggregate particles was obtained from the citric acid component. It is believed that the carbonaceous material had a non-conductive sp$^3$ structure. A further discussion of the compositional and structural characteristics of this composite material is set forth in Example 19. It is believed that the effect of the zinc aluminum oxide component on the electrochemical properties of the composite material produced may be measured without interference from the carbonaceous material.

A 2032-type button rechargeable battery was prepared using the composite material. The electrochemical characteristics of the battery, including galvanostatic charge and discharge characteristics, were studied. Generally, an electrode for a battery was made by dispersing 80 weight percent of the active composite material, 10 weight percent carbon black, and 10 weight percent polyvinylidene fluoride (PVDF) to form a mixture; coating an aluminum foil with the mixture; and drying the coated aluminum foil to produce an electrode. The electrode was employed as a cathode and combined with a lithium foil counter electrode to form the battery. The electrolyte was LiPF$_6$ (1 M) in a 1:1 by volume mixture of ethylene carbonate (EC) and dimethyl carbonate (DMC) (LI-PASTE-EDEC/PF1, Tomiyama Pure Chemical Industry, Japan). The battery was subjected to galvanostatic charge and discharge tests using a Maccor Series 4000 Automated Test System (Maccor Inc., Tulsa, Okla., U.S.A.). In these tests, the applied charge/discharge potential was in a range from 2.8 V to 4.0 V, the charge/discharge rate was set to C/5, and the temperature was maintained at room temperature.

Results from Example 4

Figure 6:
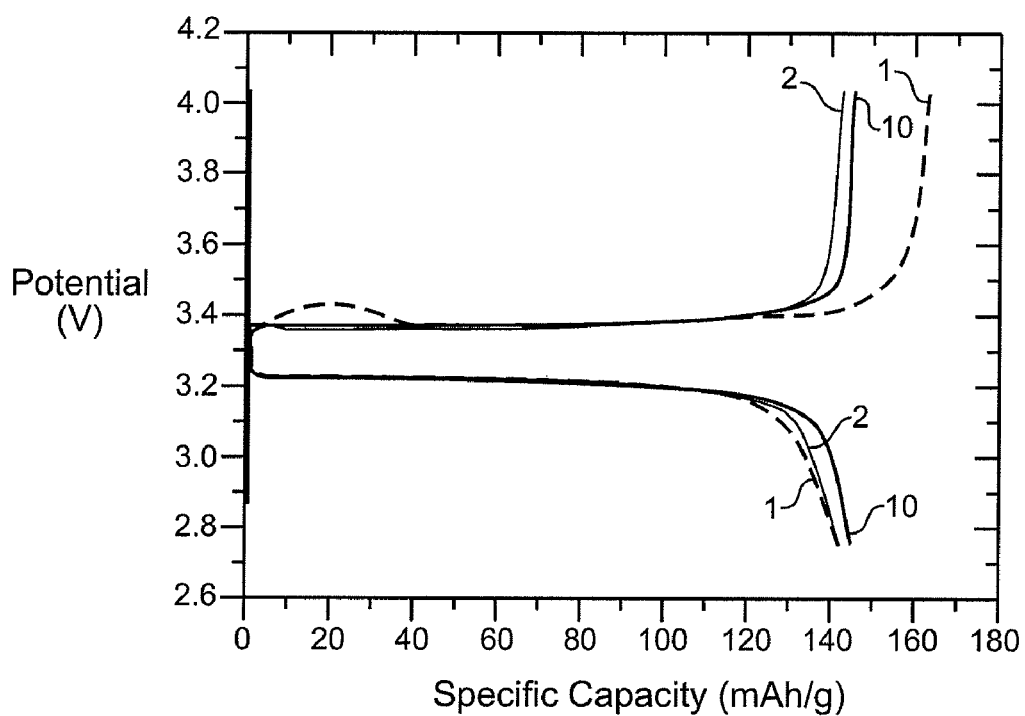
FIG. 6 is a graphical representation of potential (V) versus specific capacity (mAh/g) associated with a rechargeable battery comprising an electrode prepared using a composite material, as further described herein.

A graphical representation of potential (V) versus specific capacity (mAh/g) for the rechargeable battery from Example 4 comprising the composite material, LiFePO$_4$/CuO//C, is shown in FIG. 6. As shown in FIG. 6, for the rechargeable battery comprising this composite material, the specific capacity of the initial discharge curve (lower curve 1, one charge/discharge cycle) reached about 142 mAh/g and the specific capacity of the tenth discharge curve (lower curve 10, ten charge/discharge cycles) reached about 145 mAh/g. It is believed that these results demonstrate that the specific capacity characteristics of the composite material battery were much better than those of the comparative material battery of Example 2 discussed above.

Example 5

Other Composite Materials

Other composite materials of LiFePO$_4$/B//C, where B represents an oxide of an element selected from aluminum, silicon, zinc, cobalt, magnesium, nickel, vanadium, copper, and manganese, were prepared. Such materials included those set forth in Table 1 below, which are identified in shorthand by their respective B components. Batteries were made and tested in a manner similar to that described in any of Examples 1, 3 and 4. Specific capacity (mAh/g) data for each of the rechargeable batteries is also shown in Table 1.

TABLE 1

Specific Capacity Data for Various Composite Materials

| Oxide Component B of Composite Material | Specific Capacity (mAh/g) at first charge/discharge cycle | Specific Capacity (mAh/g) at 10th charge/discharge cycle |
|---|---|---|
| Al$_2$O$_3$ | 97 | 100 |
| SiO$_2$ | 106 | 115 |
| ZnO | 117 | 118 |
| CoO | 118 | 125 |
| MgO | 131 | 132 |
| NiO | 132 | 139 |
| V$_2$O$_5$ | 141 | 143 |
| TiO$_2$ | 144 | 146 |
| CuO | 149 | 145 |
| MnO | 150 | 155 |

As shown in Table 1, for all but one of the rechargeable batteries comprising a composite material, the specific capacity associated with the initial charge/discharge cycle was lower than the specific capacity associated with the tenth charge/discharge cycle. The one exception concerned the rechargeable battery comprising LiFePO$_4$/CuO//C, at 149 mAh/g associated with the first cycle and 145 mAh/g associated with the tenth cycle, although the results above for Example 4 were somewhat different, at 142 mAh/g associated with the first cycle and 145 mAh/g associated with the tenth cycle. It is believed that these results demonstrate that the specific capacity characteristics of the composite material battery were much better than those of the comparative material battery of Example 2 discussed above.

Example 6

Composite Material I: $LiCoPO_4/MnO//C$ $LiCoPO_4/MnO//C$ was synthesized via a sol-gel preparation route using $LiOH \cdot H_2O$, $Co(II)(NO_3)_2 \cdot 6H_2O$, $(NH_4)_2HPO_4$, and $Mn(NO_3)_2 \cdot 6H_2O$ as reactants. Stoichiometric amounts of the reactants were dissolved in deionized water, in which fructose (24 g) was added as a complexing agent for the formation of a carbon precursor. In terms of amounts, $LiOH \cdot H_2O$ (48 g), $Co(II)(NO_3)_2 \cdot 6H_2O$ (1 mole, 291 g), $Mn(NO_3)_2 \cdot 6H_2O$ (1.5 g) and $(NH_4)_2HPO_4$ (1 mole, 132 g) were dissolved in the $H_2O$-fructose solution (600 ml). The resulting solution was spray-dried to form a fine powder precursor. The fine powder precursor was placed in an aluminum oxide crucible, which was in turn placed in a furnace. The furnace was filled with a nitrogen carrier gas, a reducing atmosphere maintained in the furnace to reduce or prevent oxidation of $Co^{2+}$. The temperature of the furnace was brought from about room temperature to 800° C. at a rate of 5° C./minute and was maintained at 800° C. for 8 hours. The furnace was then cooled to room temperature. A composite material, $LiCoPO_4/MnO//C$, in a powder form was obtained.

Example 7

Composite Material II: $Li_{1.2}Fe_{1.2}PO_4/CuO//C$ $Li_{1.2}Fe_{1.2}PO_4/CuO//C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) (134 g) were added to and completely dissociated in the acidic solution, resulting in an acidic solution comprising ferric phosphate and ferrous phosphate. CuO (2 g) was then added to the acidic solution with agitation by a mixer to form a resulting acidic solution.

Lithium hydroxide (101 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $Li_{1.2}Fe_{1.2}PO_4/CuO//C$, in a powder form was obtained.

Example 8

Composite Material III: $LiFe_{0.9}PO_4/V_2O_5//C$ $LiFe_{0.9}PO_4/V_2O_5/C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) (89 g) were added to and completely dissociated in the acidic solution, resulting in an acidic solution comprising ferric phosphate and ferrous phosphate. $V_2O_5$ (3.6 g) was then added to the acidic solution with agitation by a mixer to form a resulting acidic solution.

Lithium hydroxide (84 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $LiFe_{0.9}PO_4/V_2O_5/C$, in a powder form was obtained.

Example 9

Composite Material IV: $Li_{0.2}Fe_{0.8}PO_4/V_2O_5//C$ $Li_{0.2}Fe_{0.8}PO_4N_2O_5//C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) (89 g) were added to and completely dissociated in the acidic solution, resulting in an acidic solution comprising ferric phosphate and ferrous phosphate. $V_2O_5$ (3.6 g) was then added to the acidic solution with agitation by a mixer to form a resulting acidic solution.

Lithium hydroxide (84 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $Li_{0.2}Fe_{0.8}PO_4/V_2O_5//C$, in a powder form was obtained.

Example 10

Composite Material V: $Li_{0.6}FePO_4/SiC//C$ $Li_{0.6}FePO_4/SiC//C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) (111.6 g) were added to and completely dissociated in the acidic solution, resulting in an acidic solution comprising ferric phosphate and ferrous phosphate. SiC (0.8 g) was then added to the acidic solution with agitation by a mixer to form a resulting acidic solution.

Lithium hydroxide (50.4 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $Li_{0.6}FePO_4/V_2O_5//C$, in a powder form was obtained.

Example 11

Composite Material VI: $Na_{1.1}FePO_4/SnO//C$ $Na_{1.1}FePO_4/SnO//C$ was synthesized via a sol-gel preparation route. Phosphoric acid (230 g) and citric acid (48 g)

were mixed and dissolved in deionized water (600 ml) to form an acidic solution. Iron powders (99%, Strem Chemicals Inc., Newburyport, Mass., U.S.A.) (111.6 g) were added to and completely dissociated in the acidic solution, resulting in an acidic solution comprising ferric phosphate and ferrous phosphate. SnO (2.7 g) was then added to the acidic solution with agitation by a mixer to form a resulting acidic solution.

Sodium hydroxide (80 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $Na_{1.1}FePO_4/SnO//C$, in a powder form was obtained.

Example 12

Composite Material VII: $LiFePO_4/Ag_2O//C$ $LiFePO_4/Ag_2O//C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) (111.6 g) were added to and completely dissociated in the acidic solution, resulting in an acidic solution comprising ferric phosphate and ferrous phosphate. $Ag_2O$ (1.2 g) was then added to the acidic solution with agitation by a mixer to form a resulting acidic solution.

Lithium hydroxide (84 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $LiFePO_4/Ag_2O//C$, in a powder form was obtained.

Example 13

Composite Material VIII: $LiFePO_4/La_2O_3//C$ $LiFePO_4/La_2O_3//C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) ((111.6 g) were added to and completely dissociated in the acidic solution, resulting in an acidic solution comprising ferric phosphate and ferrous phosphate. $La_2O_3$ (3.2 g) was then added to the acidic solution with agitation by a mixer to form a resulting acidic solution.

Lithium hydroxide (84 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $LiFePO_4/La_2O_3//C$, in a powder form was obtained.

Example 14

Composite Material IX: $LiFePO_4/MoO_2//C$ $LiFePO_4/MoO_2//C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) (111.6 g) were added to and completely dissociated in the acidic solution, resulting in an acidic solution comprising ferric phosphate and ferrous phosphate. $MoO_2$ (2 g) was then added to the acidic solution with agitation by a mixer to form a resulting acidic solution.

Lithium hydroxide (84 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $LiFePO_4/MoO_2//C$, in a powder form was obtained.

Example 15

Composite Material X: $LiFePO_4/Bi_2O_3//C$ $LiFePO_4/Bi_2O_3//C$ was synthesized via a sol-gel preparation route. Phosphoric acid (230 g) and citric acid (48 g) were mixed and dissolved in deionized water (600 ml) to form an acidic solution. Iron powders (99%, Strem Chemicals Inc., Newburyport, Mass., U.S.A.) (111.6 g) were added to and completely dissociated in the acidic solution, resulting in an acidic solution comprising ferric phosphate and ferrous phosphate. $Bi_2O_3$ (4.6 g) was then added to the acidic solution with agitation by a mixer to form a resulting acidic solution.

Lithium hydroxide (84 g) was dissolved in water (600 ml) to form a basic solution. The basic solution was added to the acidic solution to form a combined solution. The combined solution was spray-dried to form a fine powder precursor. The fine powder precursor was placed in an aluminum oxide crucible, which was in turn placed in a furnace. The furnace was filled with a nitrogen carrier gas. The temperature of the furnace was brought from about room temperature to 800° C. at a rate of 5° C./minute and was maintained at 800° C. for 8 hours. The furnace was then cooled to room temperature. A composite material, $LiFePO_4/Bi_2O_3//C$, in a powder form was obtained.

Example 16

Composition Characteristics of Composite Materials I-X

The composition of each of Composition Materials I-X was studied using inductively coupled plasma techniques to determine the content of certain elemental components in mole percent relative to the composition. The results appear in Table 2 set forth below, where a dash indicates no data, as in some cases, it was difficult to determine values using inductively coupled plasma technology. Merely by way of convenience, some of the data may have been rounded up in the description or identification of a particular composite material in any of Examples 6-15 above. As shown in Table 2, the second material may be present in a relatively small amount, such as from greater than zero to less than or equal to about 0.1, such as less than or equal to about 0.6, for example.

TABLE 2

Compositional Data for Various Composite Materials

| Composite Material | Li or Na (%) | Co or Fe (%) | P (%) | Second Material B (%) |
|---|---|---|---|---|
| I | 0.996 | 1 | 1.0567 | 0.04 |
| II | 1.24 | 1.24 | 1 | 0.04 |
| III | 0.98 | 0.78 | 1 | 0.02 |
| IV | 0.19 | 0.9 | 1 | — |
| V | 0.63 | 1 | 1.04 | — |
| VI | 1.08 | 1 | 1.05 | — |
| VII | 1.03 | 1 | 1.02 | — |
| VIII | 1.04 | 1 | 1.06 | — |
| IX | 0.99 | 1 | 0.99 | — |
| X | 0.98 | 1 | 1 | — |

Example 17

Coin Cells Prepared Using Composite Materials I-X and a Comparative Material

CR2032 coin cells were prepared using the various Composite Materials I-X and used to study the electrochemical characteristics of these batteries, including galvanostatic charge and discharge characteristics. Generally, an electrode for a coin cell was made by dispersing 85 weight percent of the active composite material, 8 weight percent carbon black, and 7 weight percent polyvinylidene fluoride (PVDF) in n-methylpyrrolidone (NMP) to form a slurry; coating the slurry onto an aluminum foil; and drying the coated aluminum electrodes in a vacuum oven, followed by pressing the electrode at 1200 kg/cm². Each coin cell was assembled in an argon-filled glove box (Mbraun, Unilab, Germany) using a lithium foil as a counter electrode. In the electrochemical characterization study of a given coin cell, an electrolyte of $LiPF_6$ (1 M) in a 1:1 mixture of ethylene carbonate (EC) and dimethyl carbonate (DMC) was used. In each cyclic voltammetry (CV) study, measurements were performed using an electrochemical working station at a scanning rate of 0.1 mV/s, and each cell was galvanostatically charged and discharged at a C/10 rate over a voltage range of 2.5 to 4.0 V.

A CR2032 coin cell was prepared using native $LiFePO_4$ as a comparative material. This coin cell was made in substantially the same manner as that used for the composite material coin cells, with the exception that the comparative material replaced the active composite material. This coin cell was tested in substantially the same manner as that used for the composite material coin cells.

Results from Example 17

Figure 7:
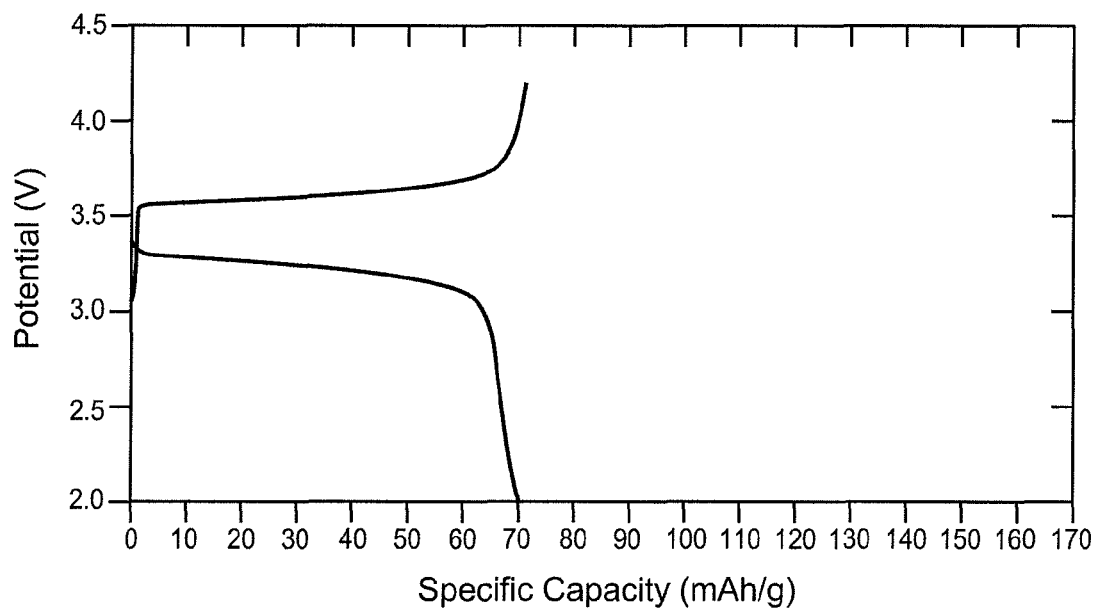
FIG. 7 is a graphical representation of potential (V) versus specific capacity (mAh/g) associated with an electrochemical coin cell comprising an electrode prepared using a comparative material, as further described herein.
Figure 8:
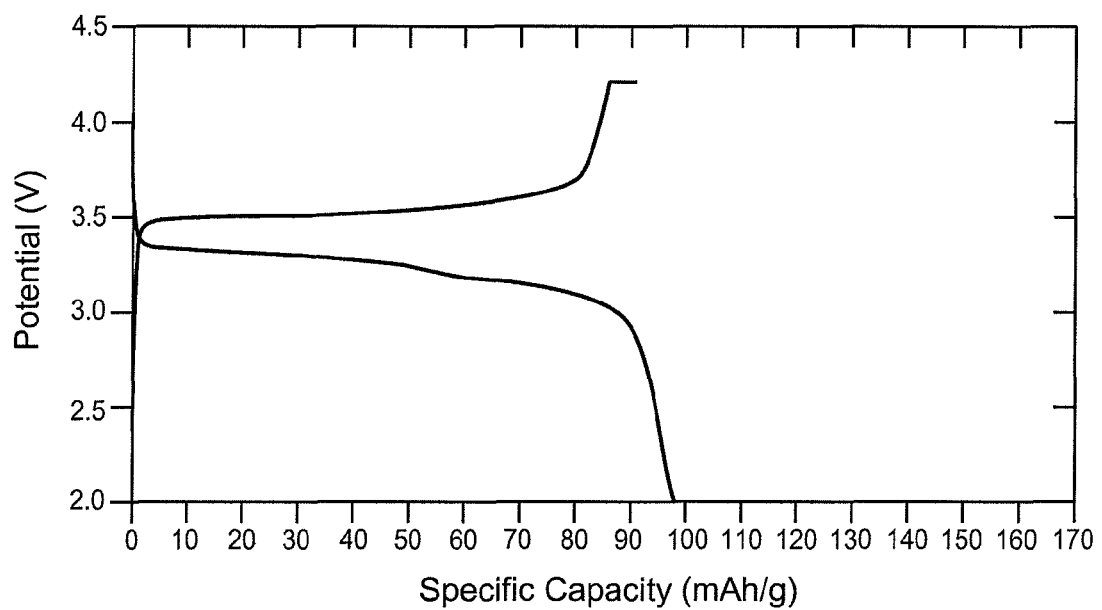
Figure 9:
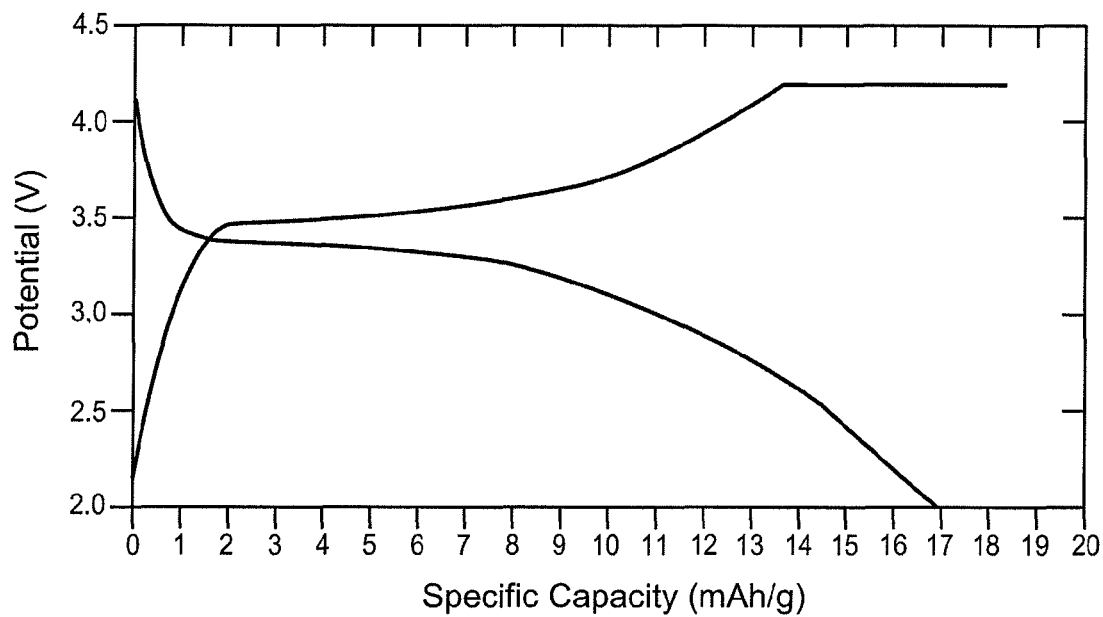
Figure 10:
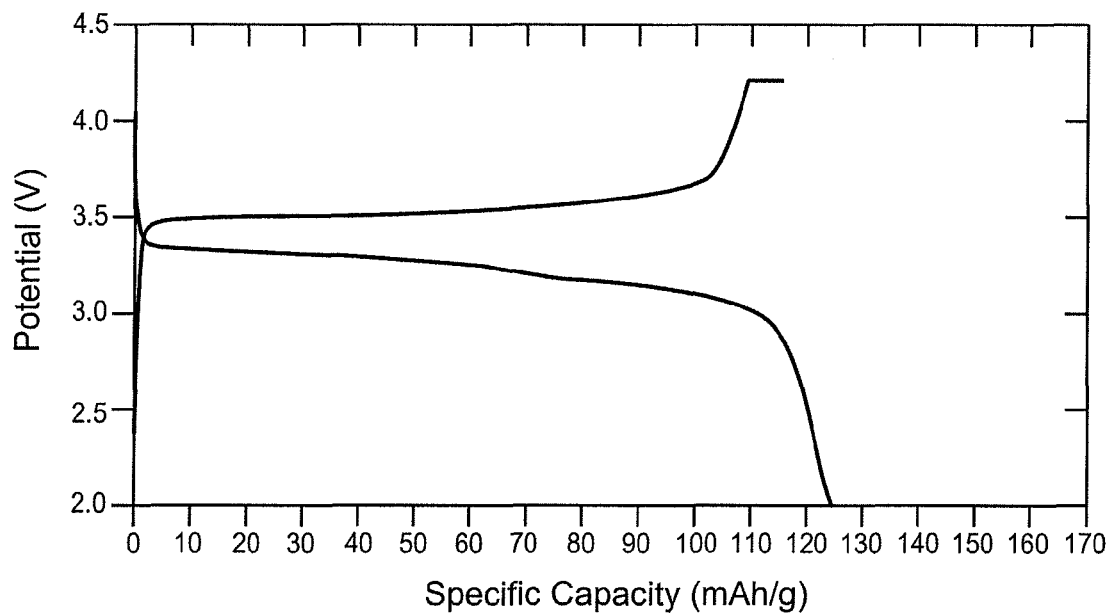
Figure 11:
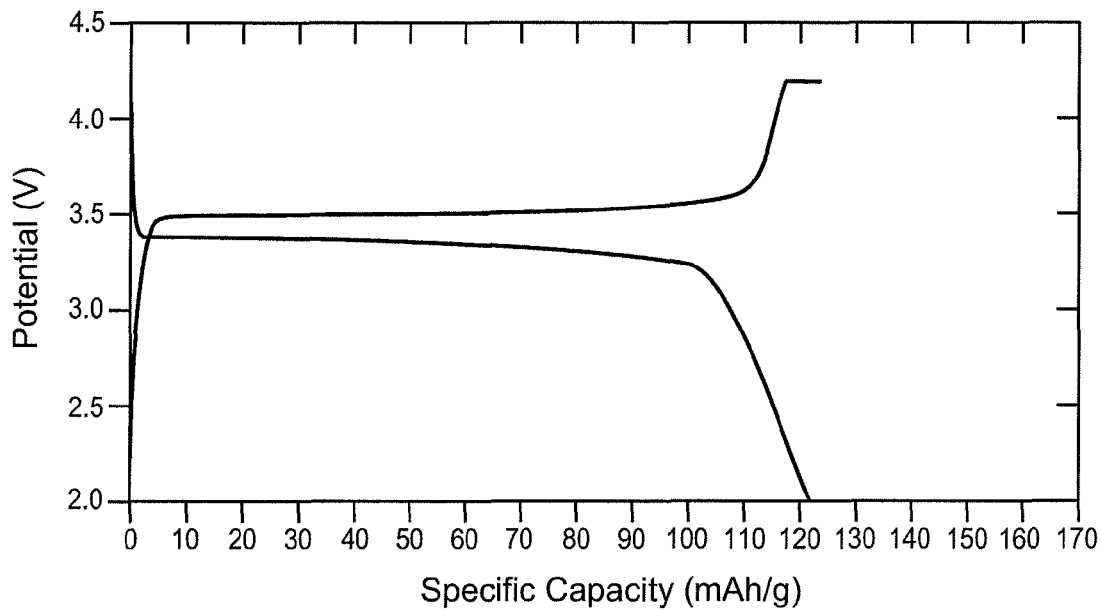
Figure 12:
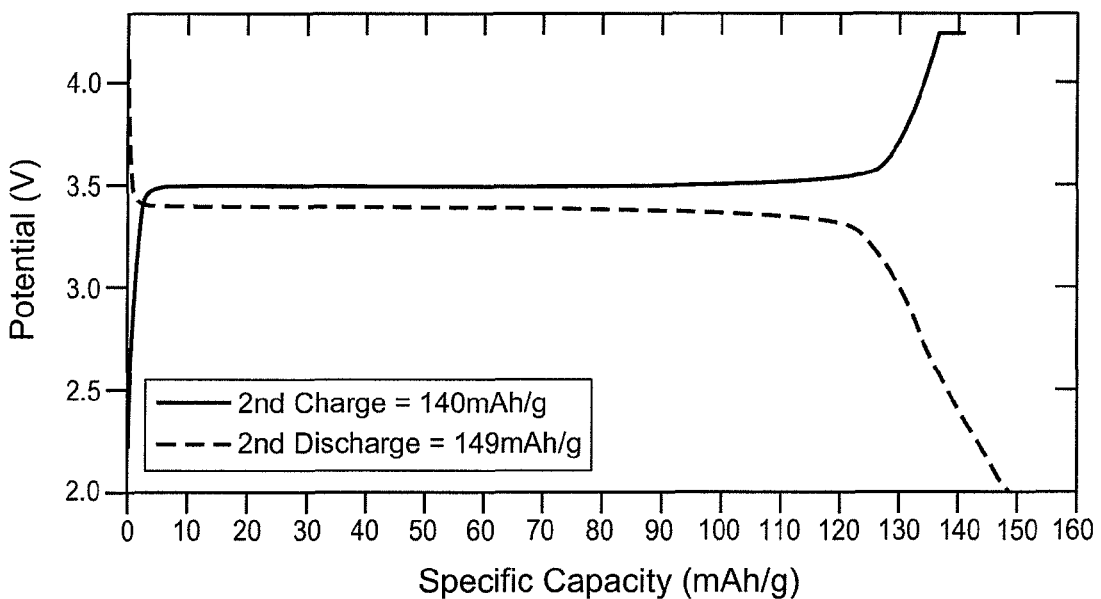
Figure 13:
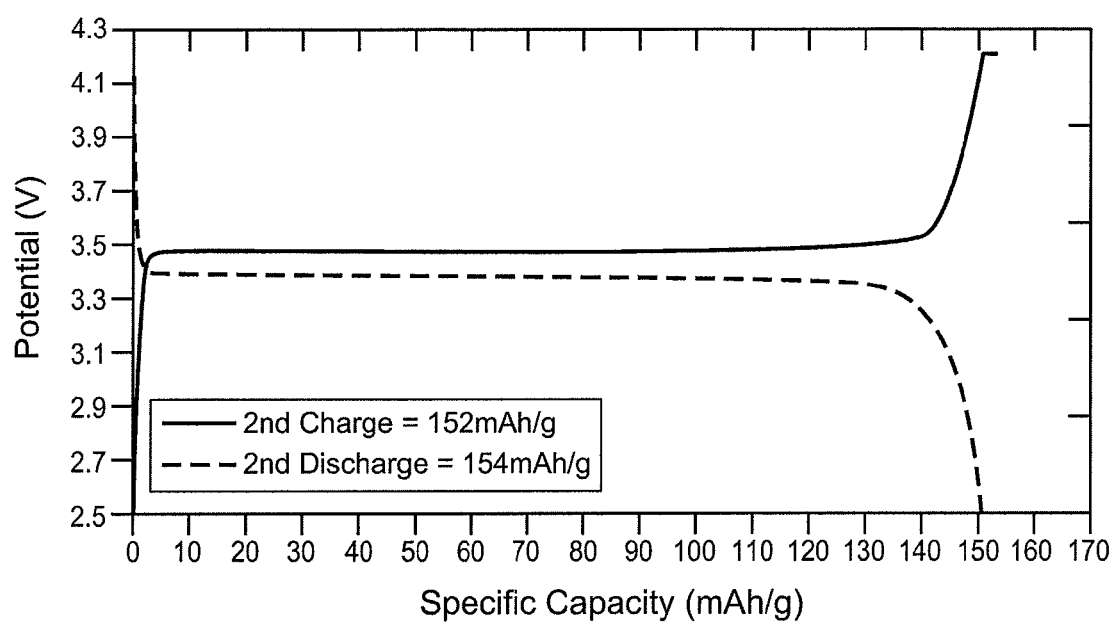
FIG. 13 is a graphical representation of potential (V) versus specific capacity (mAh/g) associated with an electrochemical coin cell comprising an electrode prepared using a comparative material, as further described herein.

A graphical representation of potential (V) versus specific capacity (mAh/g) associated with a second charge/discharge cycle for a coin cell prepared in Example 18 using the $LiFePO_4$ comparative material is shown in FIG. 7. A graphical representation of potential (V) versus specific capacity (mAh/g) associated with a second charge/discharge cycle for a coin cell prepared in Example 17 using Composite Material II, V, VII, VIII, IX or X, respectively, are shown in FIGS. 8, 9, 10, 11, 12 and 13, respectively. As shown in FIGS. 7-13, the charge and discharge curves for each coin cell show relatively flat plateaus, with each of the charve curves having a plateau at about 3.5 volts and each of the discharge curves having a plateau at about 3.4 volts.

Specific charge and discharge capacity data associated with a second charge/discharge cycle for several of the coin cells prepared, including the comparative material coin cell, the four composite material coin cells just described and two further composite material coin cells, are shown in Table 3 below.

TABLE 3

Specific Charge and Discharge Capacity Data for Various Coin Cells

| Material of Coin Cell | Second Charge Capacity (mAh/g) | Second Discharge Capacity (mAh/g) |
|---|---|---|
| Comparative Material | 72 | 70 |
| Composite Material II | 90 | 98 |
| Composite Material V | 14 | 17 |
| Composite Material VII | 125 | 124 |
| Composite Material VIII | 120 | 122 |
| Composite Material IX | 140 | 149 |
| Composite Material X | 152 | 154 |

A specific discharge capacity of about 70 mAh/g for the coin cell prepared using the $LiFePO_4$ comparative material was lower than the specific discharge capacity associated with each of the coin cells prepared using one of Composite Materials II, VII, VIII, IX and X. It is believed that these results indicate that each of the coin cells prepared using one of Composite Materials II, VII, VIII, IX and X had a smaller electrochemical polarization than did the coin cell prepared using the $LiFePO_4$ comparative material. It is believed that these results demonstrate that the specific capacity characteristics of the majority of the composite material coin cells were much better than those of the comparative material battery coin cell used in Example 17.

Example 18

Compositional and Structural Data for Composite Materials Lacking a Second Material A first composite material lacking a second material was prepared as now described. Iron powders (99%, Strem Chemicals Inc., Newburyport, Mass., U.S.A.) (0.2 mole) were dissolved in deionized water (200 ml) to form a solution. Phosphoric acid (0.2 mole) and then a 2N solution of lithium hydroxide (100 ml) were added to the solution, forming a combined solution having a 1:1:1 stoichiometric ratio of $Fe^{3+}:Li^+:PO_4^{3-}$. A solution (100 ml) of citric acid (0.42 g) was added to the combined solution to form a resulting solution. The resulting solution was dried to form a $LiFePO_4$-based particulate precursor.

The precursor was placed in an aluminum oxide crucible, which was in turn placed in a tubular furnace along with charcoal. The furnace was filled with a flowing argon carrier gas. The furnace was heated at 700° C. for 12 hours. Carbon particles from the charcoal and particles from the precursor were suspended in the carrier gas and mixed. The furnace was then cooled to room temperature. A first composite material, $LiFePO_4$//C, in a powder form was obtained.

A second composite material lacking a second material was prepared as now described. A $LiFePO_4$-based precursor was prepared as described above. The precursor was placed in an aluminum oxide crucible, which was in turn placed in a tubular furnace. The furnace was filled with a flowing argon carrier gas. The furnace was brought from room temperature to 600° C. at a rate of 5 C/minute and was maintained at 600° C. for 4 hours. The furnace was then cooled to room temperature. The resulting primary particulate material was mixed with and dispersed in a polyvinylene alcohol solution (2 weight %, in a solid-to-liquid ratio of 40:60) via a 3-hour granulation process in a ball mill. The resulting slurry was spray-dried to form a secondary particulate material. This secondary particulate material was placed in an aluminum oxide crucible, which was in turn placed in a tubular furnace along with charcoal. The furnace was filled with a flowing nitrogen carrier gas. The furnace was heated at 800° C. for 8 hours. Carbon particles from the charcoal and particles from the precursor were suspended in the carrier gas and mixed. The furnace was then cooled to room temperature. A second composite material, $LiFePO_4//C$, in a powder form was obtained.

Figure 14:
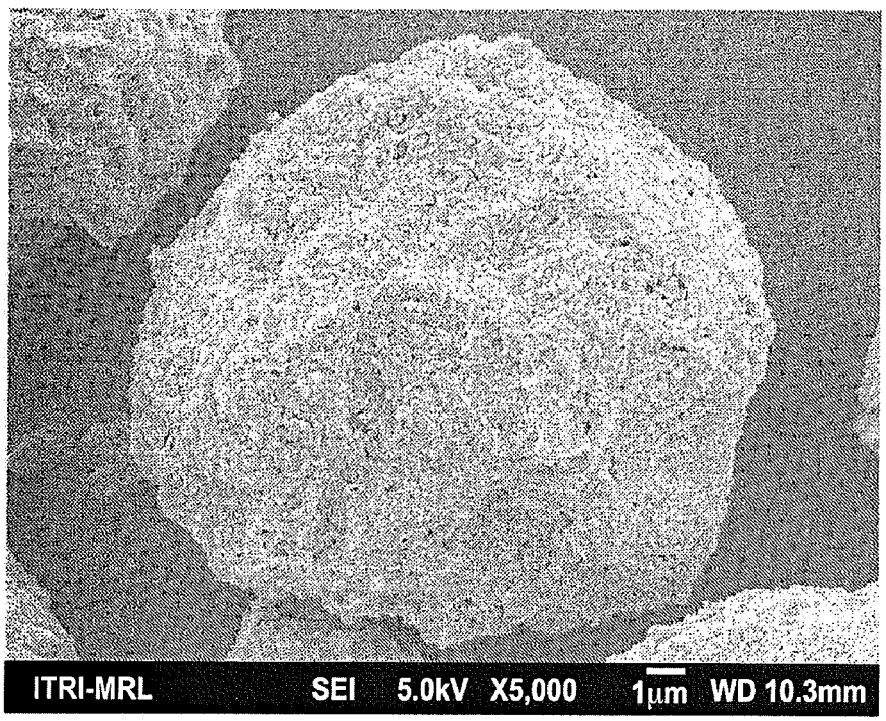
Figure 15:
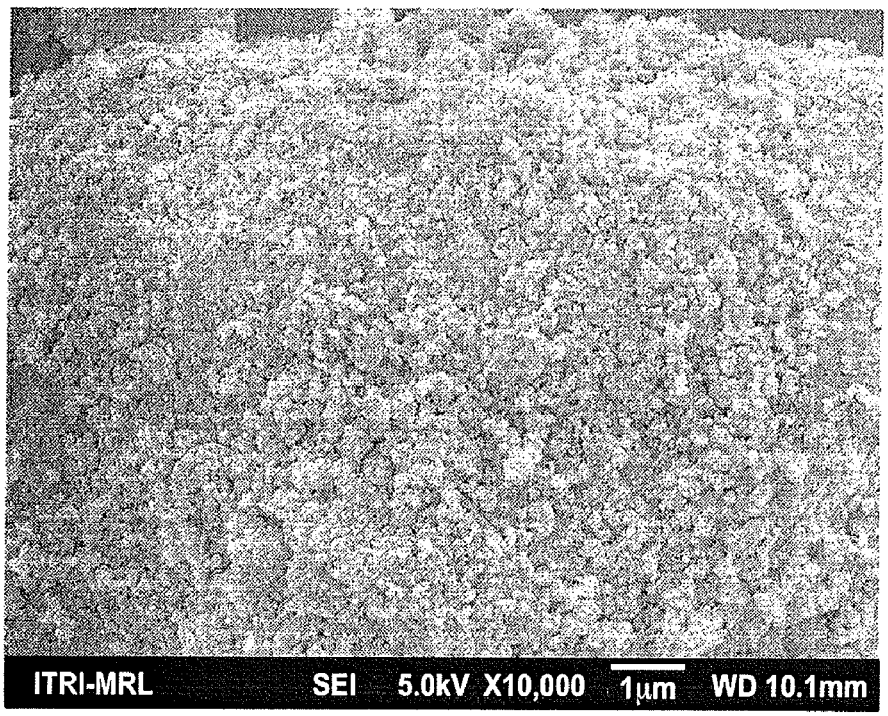
FIG. 15 shows a photographic image of a composite material lacking a second material, as further described herein.

FIG. 14 and FIG. 15 show Scanning Electron Microscope (SEM) photographs of the first composite material using 5000× and 10,000× magnification, respectively. The line appearing in the bottom edge of FIG. 14 represents 1 micrometer and the line appearing in the bottom edge of FIG. 15 represents 1 micrometer. The photograph of FIG. 14 shows microscale aggregate particles of the first composite material, an individual particle of which was considered to be larger than 10 micrometers in effective diameter. The photograph of FIG. 15 shows that an individual aggregate particle comprised nanoscale component particles, an individual particle of which was considered to be from about 50 nanometers to about 100 nanometers in effective diameter. It is believed that these component particles were crystalline. It is believed that carbon particles, which are not visible in the photographs, formed an at least partial coating on the surface of the nanoscale component particles.

Figure 16:
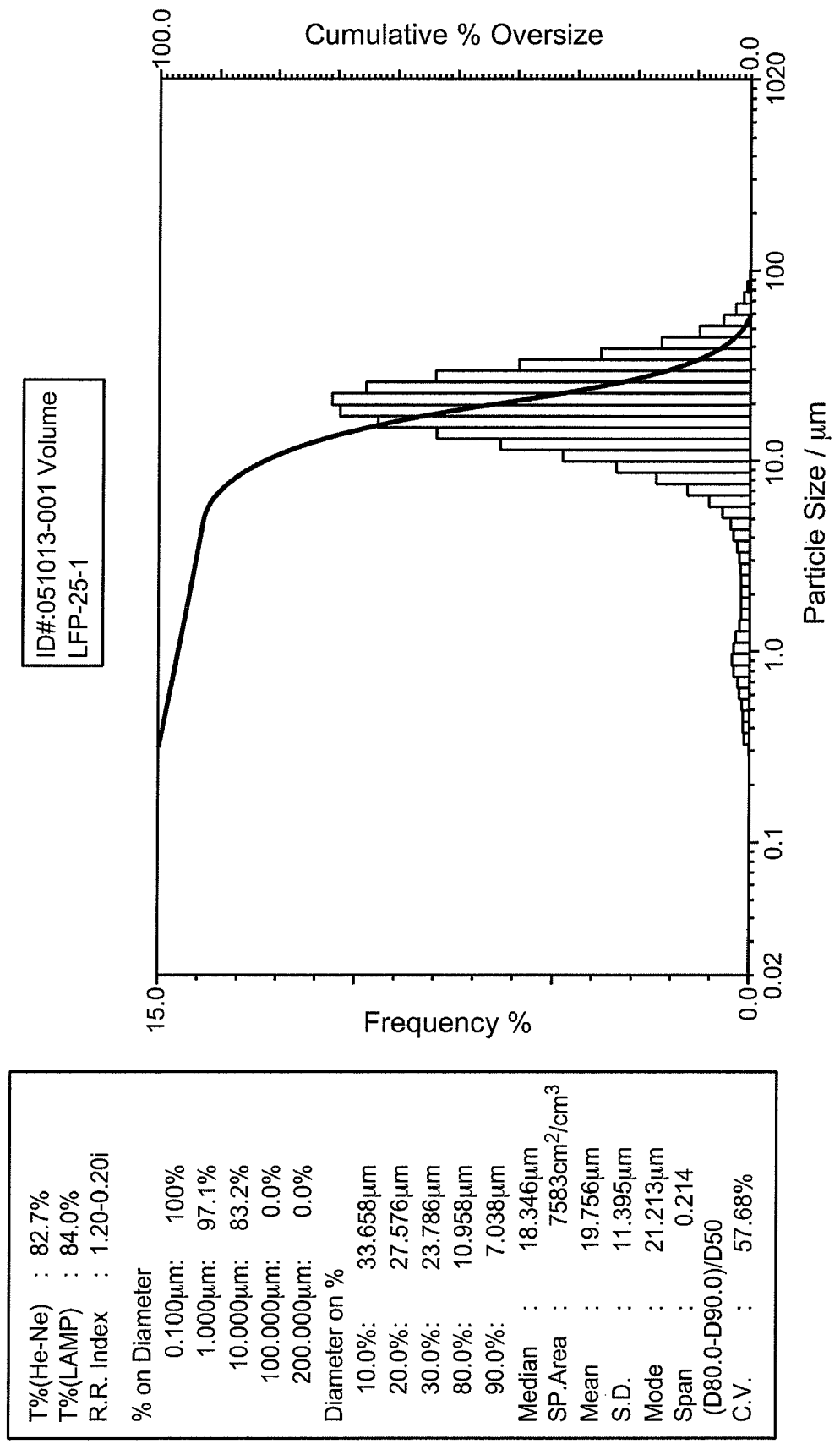
FIG. 16 shows a graphical representation of data from a particle size distribution analyzer for a composite material lacking a second material, as further described herein.

A particle size distribution analyzer (ASVR S3000 Particle Size Analyzer, Microtrac, Inc. Montgomeryville, Pa., U.S.A.) was used to further evaluate the first composite material. FIG. 16 is a graphical representation of the results obtained. The results show that 10%, 20%, 30%, 50%, 80% and 90% of the cumulative volumetric diameters of the first composite material were about 33.7 micrometers, about 27.6 micrometers, about 23.8 micrometers, about 18.3 micrometers, about 11.0 micrometers and about 7.0 micrometers, respectively. It is believed the data obtained show that the first composite material comprises microscale aggregate particles. It is believed that the data obtained, including the appearance of one major peak, for example, show that the particle size distribution is relatively uniform.

Figure 17:
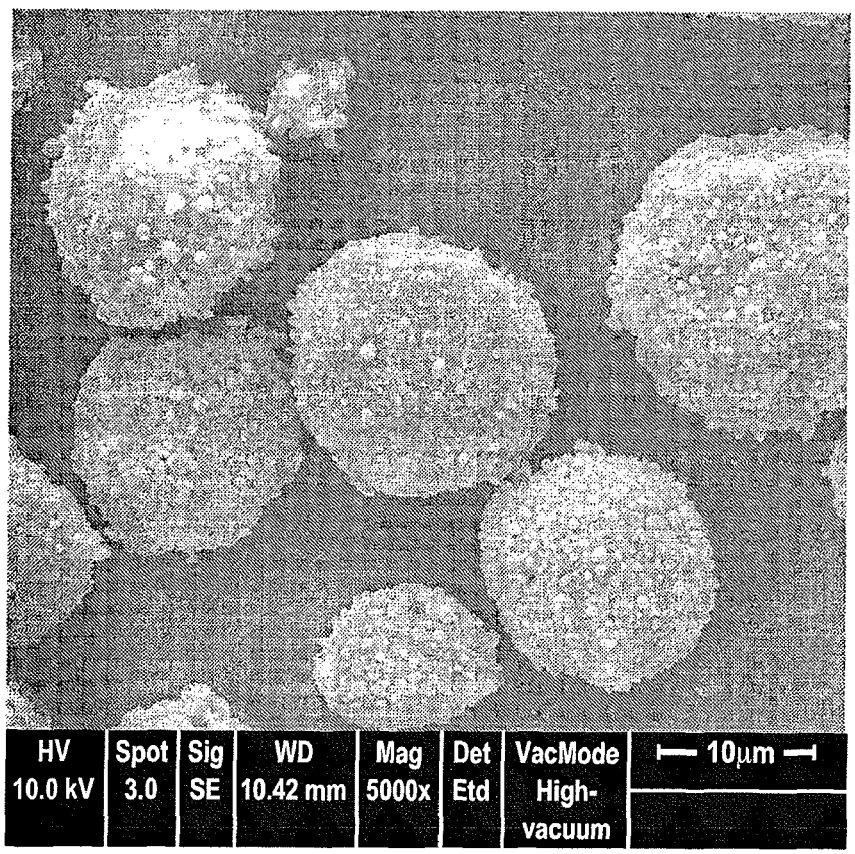
FIG. 17 shows a photographic image of a composite material lacking a second material, as further described herein.

FIG. 17 shows a Scanning Electron Microscope (SEM) photograph of the second composite material using 5000× magnification. The line appearing in the bottom edge of FIG. 17 represents 10 micrometers. The photograph of FIG. 17 shows microscale aggregate particles of the second composite material, an individual particle of which was considered to be larger than 10 micrometers in effective diameter. The Brunauer-Emmett-Teller (BET) specific surface area of the aggregate particles was determined; to be about 39 m²/g. See Brunauer et al., *J. Amer. Chem. Soc.* 60, 309 (1938). The photograph of FIG. 17 shows that an individual aggregate particle comprised nanoscale component particles, an individual particle of which was considered to be from about 50 nanometers to about 100 nanometers in effective diameter. It is believed that these component particles were crystalline.

Example 19

Compositional and Structural Data for Composite Material $LiFePO_4/CuO//C$

The composite material, $LiFePO_4/CuO//C$, of Example 4 was evaluated using inductively coupled plasma (ICP) optical emission spectroscopy (Optima 2100DV, PerkinElmer, Inc., Waltham, Mass., U.S.A.) and particle size distribution analysis (ASVR S3000 Particle Size Analyzer, Microtrac, Inc., Montgomeryville, Pa., U.S.A.) to determine compositional and structural characteristics. See Gladstone et al., *Introduction to Atomic Emission Spectrometry*, ICP Optical Emission Spectroscopy, Technical Note 12. The composite material was found to have a compositional Li:Fe:P:CuO molar ratio of 1:1:1:0.01 via ICP optical emission spectroscopy and a $D_{50}$ particle size (effective diameter) of 18.91 micrometers via particle size distribution analysis.

Figure 18:
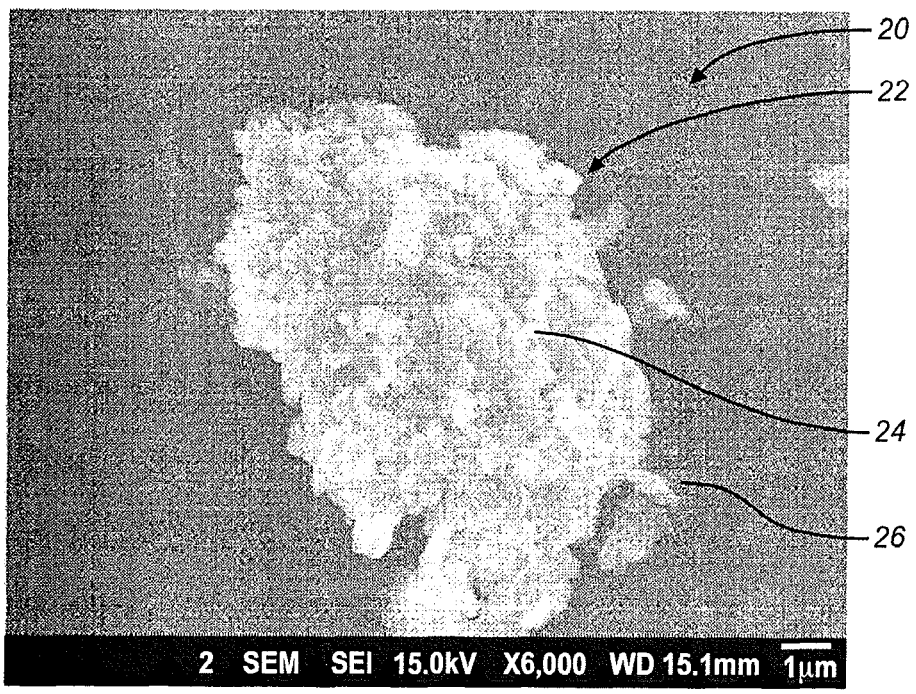
FIG. 18 is a photograph of a composite material comprising a second material, as further described herein.

FIG. 18 shows a photographic image of the composite material. The line appearing in the right lower corner of FIG. 18 represents 1 micrometer and the magnification is 6000×. Based on the data obtained in connection with Example 18 and in this Example 19, it is believed that the composite material 20 comprised microscale aggregate particles of lithium ferrous phosphate particles. It is believed that these aggregate particles were dispersed with copper oxide and carbonaceous material and/or coated by copper oxide and carbonaceous material. An individual aggregate particle 22 was greater than one micrometer in effective diameter. It is believed that an individual aggregate particle comprised crystalline component particles 24. An individual component particle 24 was considered to be from about 10 to about 500 nanometers in effective diameter. It is believed that a carbonaceous material 26 at least partially coated or adhered to the outside of the individual aggregate particle 22. It is believed that other composite materials described herein exhibit such or similar characteristics.

It is believed that the composite materials described herein differ in important ways from comparative materials, such as $LiFePO_4$. For example, it is believed that such composite materials have enhanced properties, such as ion conductivity, ion diffusion, electrochemical reversibility, charge and discharge characteristics, for example, relative to such comparative materials. The composite materials are believed to have good structural and heat stability. The composite materials described herein are believed to be particularly useful in electrochemical applications. For example, an electrochemical cell, sensor or battery, such as a rechargeable lithium battery, for example, comprising an electrode made of such a composite material may provide good charge/discharge capacity, good charge/discharge capacity retention, and/or good charge/discharge rate capability. Further by way of example, a composite material described herein may be usefully employed as a component material of an electrode of a rechargeable battery that provides large current output and/or is used in multiple series or parallel rechargeable battery units.

Various modifications, processes, as well as numerous structures that may be applicable herein will be apparent. Various aspects, features or embodiments may have been explained or described in relation to understandings, beliefs, theories, underlying assumptions, and/or working or prophetic examples, although it will be understood that any particular understanding, belief, theory, underlying assumption, and/or working or prophetic example is not limiting. Although the various aspects and features may have been described with respect to various embodiments and specific examples herein, it will be understood that any of same is not limiting with respect to the full scope of the appended claims or other claims that may be associated with this application.

The invention claimed is:

1. A composition for use in an electrochemical redox reaction, comprising:
a first material represented by a general formula $M_yXO_4$, wherein M represents at least one element selected from the group consisting of transition metal elements, zinc, cadmium, beryllium, magnesium, calcium, strontium, boron, aluminum, silicon, gallium, germanium, indium, tin, antimony, and bismuth; X represents at least one element selected from the group consisting of phosphorus, arsenic, silicon and sulfur; O represents oxygen; and y represents a number from about 0.6 to about 1.4 inclusive;
wherein the first material is capable of being intercalated with ionic A to form $A_xM_yXO_4$, wherein A represents at least one element selected from the group consisting of alkali metal elements, beryllium, magnesium, cadmium, boron, and aluminum; and x represents a number greater than 0 and less than or equal to 1.4; and
another material selected from the group consisting of SiC, BN, carbon tube material, carbon fiber material, and an oxide of at least one element selected from the group consisting of transition metal elements, zinc, cadmium, beryllium, magnesium, calcium, strontium, boron, aluminum, silicon, gallium, germanium, indium, tin, antimony, and bismuth;
wherein at least a portion of said another material at least partially coats said first material;
wherein said first material comprises aggregate particles, an individual particle of which comprises component particles, an individual particle of the aggregate particles is greater than or equal to about 1 micrometer in effective diameter, and an individual particle of the component particles is from about 10 to about 500 nanometers in effective diameter.

2. A composition for use in an electrochemical redox reaction, comprising:
a first material represented by a general formula $A_xM_yXO_4$, wherein in the general formula A represents at least one element selected from the group consisting of alkali metal elements, beryllium, magnesium, cadmium, boron, and aluminum; M represents at least one element selected from the group consisting of transition metal elements, zinc, cadmium, beryllium, magnesium, calcium, strontium, boron, aluminum, silicon, gallium, germanium, indium, tin, antimony, and bismuth; X represents at least one element selected from the group consisting of phosphorus, arsenic, silicon and sulfur; O represents oxygen; x represents a number greater than 0 and less than or equal to 1.4; y represents a number from about 0.6 to about 1.4 inclusive; and
another material selected from the group consisting of SiC, BN, carbon tube material, carbon fiber material, and an oxide of at least one element selected from the group consisting of transition metal elements, zinc, cadmium, beryllium, magnesium, calcium, strontium, boron, aluminum, silicon, gallium, germanium, indium, tin, antimony, and bismuth;
wherein at least a portion of said another material at least partially coats said first material;
wherein said first material comprises aggregate particles, an individual particle of which comprises component particles, an individual particle of the aggregate particles is greater than or equal to about 1 micrometer in effective diameter, and an individual particle of the component particles is from about 10 to about 500 nanometers in effective diameter.

3. The composition of claim 1 or claim 2, wherein A represents at least one element selected from the group consisting of lithium, sodium, potassium, beryllium, magnesium, boron, and aluminum.

4. The composition of claim 1 or claim 2, wherein M represents at least one element selected from the group consisting of first row transition metal elements.

5. The composition of claim 1 or claim 2, wherein X represents at least one element selected from the group consisting of phosphorus and arsenic.

6. The composition of claim 1 or claim 2, wherein A represents at least one element selected from the group consisting of alkali metal elements; M represents at least one element selected from the group consisting of transition metal elements; and X represents at least one element selected from the group consisting of phosphorus and arsenic.

7. The composition of claim 1 or claim 2, wherein the oxide is an oxide of at least one element selected from the group consisting of first row transition metal elements, second row transition metal elements, zinc, magnesium, aluminum, and silicon.

8. The composition of claim 1 or claim 2, wherein the oxide is an oxide of at least one element selected from the group consisting of titanium, vanadium, manganese, cobalt, nickel, copper, zinc, magnesium, aluminum, and silicon.

9. The composition of claim 1 or claim 2, wherein the oxide is selected from the group consisting of an oxide of zinc and aluminum, an oxide of copper, and an oxide of zinc.

10. The composition of claim 1 or claim 2, wherein said another material is present in an amount from about 0.1 to about 5 percent by weight inclusive relative to the composition.

11. The composition of claim 1 or claim 2, wherein at least a portion of said another material is at least partially distributed within said material.

12. The composition of claim 1 or claim 2, further comprising a carbonaceous material.

13. The composition of claim 1 or claim 2, further comprising a carbonaceous material in an amount of less than or equal to 5 weight percent relative to the composition.

14. The composition of claim 12, wherein at least a portion of the carbonaceous material at least partially coats said material.

15. The composition of claim 12, wherein at least a portion of the carbonaceous material is at least partially distributed within said material.

16. The composition of claim 1 or claim 2, wherein an individual particle of the aggregate particles has a BET specific surface area in a range of from about 5 $m^2$/g to about 100 $m^2$/g.

17. The composition of claim 1 or claim 2, wherein the component particles are crystalline.

18. The composition of claim 1 or claim 2, wherein at least a portion of said another material at least partially coats an individual particle of the aggregate particles.

19. The composition of claim 1 or claim 2, wherein at least a portion of said another material is at least partially distributed within an individual particle of the aggregate particles.

20. The composition of claim 1 or claim 2, further comprising a carbonaceous material, wherein at least a portion of the carbonaceous material at least partially coats an individual particle of the aggregate particles.

21. The composition of claim 1 or claim 2, further comprising a carbonaceous material, wherein at least a portion of the carbonaceous material is at least partially distributed within an individual particle of the aggregate particles.

22. The composition of claim 1 or claim 2, wherein said material is of an olivine structure.

23. An electrode comprising the composition of claim 1 or claim 2.

24. The electrode of claim 23, wherein the electrode is a cathode.

25. An electrochemical cell comprising an electrode of claim 23.

* * * * *